United States Patent
Seregin et al.

(10) Patent No.: US 11,431,968 B2
(45) Date of Patent: Aug. 30, 2022

(54) VARIABLE NUMBER OF INTRA MODES FOR VIDEO CODING

(71) Applicant: QUALCOMM Incorporated, San Diego, CA (US)

(72) Inventors: Vadim Seregin, San Diego, CA (US); Nan Hu, San Diego, CA (US); Wei-Jung Chien, San Diego, CA (US); Marta Karczewicz, San Diego, CA (US); Xin Zhao, Santa Clara, CA (US); Vijayaraghavan Thirumalai, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 127 days.

(21) Appl. No.: 16/670,759

(22) Filed: Oct. 31, 2019

(65) Prior Publication Data
US 2020/0068194 A1 Feb. 27, 2020

Related U.S. Application Data

(63) Continuation of application No. 15/723,950, filed on Oct. 3, 2017, now Pat. No. 10,506,228.
(Continued)

(51) Int. Cl.
*H04N 19/00* (2014.01)
*H04N 19/11* (2014.01)
(Continued)

(52) U.S. Cl.
CPC .......... *H04N 19/11* (2014.11); *H04N 19/157* (2014.11); *H04N 19/159* (2014.11);
(Continued)

(58) Field of Classification Search
CPC ...... H04N 7/32; H04N 19/593; H04N 19/196; H04N 19/463; H04N 19/159; H04N 19/11; H04N 19/157; H04N 19/176
See application file for complete search history.

(56) References Cited

U.S. PATENT DOCUMENTS 8,923,395 B2 12/2014 Wang et al.
9,154,796 B2 10/2015 Seregin et al.
(Continued)

FOREIGN PATENT DOCUMENTS

CN 101605255 A 12/2009
CN 102685474 A 9/2012
(Continued)

OTHER PUBLICATIONS

Bossen F., et al., "HM Software Manual," Joint Collaborative Team on Video Coding (JCT-VC) of ITU-T SG16 WP3 and ISO/IEC JTC1/SC29/WG11, Document: JCTVC-Software Manual, Retrieved on Jun. 18, 2015, pp. 1-27.
(Continued)

*Primary Examiner* — Frank F Huang
(74) *Attorney, Agent, or Firm* — Shumaker & Sieffert, P.A.

(57) ABSTRACT

A video coder determines a first block of the video data is intra mode coded; based on a first height and the first width of the first block, identifies a group of N available intra prediction modes for the first block of video data; selects from the group of N available intra prediction modes, a first intra prediction mode used to code the first block of the video data; and codes the first block using the first intra prediction mode. A video coder generates a first most probable mode (MPM) candidate list for the block; codes a first flag indicating an actual intra prediction mode used to code the block is not included in the first MPM candidate list; generates a second MPM candidate list by deriving at
(Continued)

least one candidate intra prediction mode based on an intra prediction mode in the first MPM candidate list.

24 Claims, 9 Drawing Sheets

Related U.S. Application Data

(60) Provisional application No. 62/404,128, filed on Oct. 4, 2016.

(51) Int. Cl.

| | | |
|---|---|---|
| *H04N 19/157* | (2014.01) | |
| *H04N 19/463* | (2014.01) | |
| *H04N 19/159* | (2014.01) | |
| *H04N 19/176* | (2014.01) | |
| *H04N 19/593* | (2014.01) | |
| *H04N 19/10* | (2014.01) | |
| *H04N 19/103* | (2014.01) | |
| *H04N 19/105* | (2014.01) | |
| *H04N 19/112* | (2014.01) | |
| *H04N 19/122* | (2014.01) | |
| *H04N 19/129* | (2014.01) | |
| *H04N 19/149* | (2014.01) | |
| *H04N 19/167* | (2014.01) | |
| *H04N 19/169* | (2014.01) | |
| *H04N 19/182* | (2014.01) | |

(52) U.S. Cl.
CPC ......... *H04N 19/176* (2014.11); *H04N 19/463* (2014.11); *H04N 19/593* (2014.11); *H04N 19/10* (2014.11); *H04N 19/103* (2014.11); *H04N 19/105* (2014.11); *H04N 19/112* (2014.11); *H04N 19/122* (2014.11); *H04N 19/129* (2014.11); *H04N 19/149* (2014.11); *H04N 19/167* (2014.11); *H04N 19/169* (2014.11); *H04N 19/182* (2014.11)

(56) References Cited

U.S. PATENT DOCUMENTS

| | | | |
|---|---|---|---|
| 9,344,728 B2 | 5/2016 | Oh et al. | |
| 2012/0177113 A1* | 7/2012 | Guo | H04N 19/463 375/240.12 |
| 2012/0314766 A1 | 12/2012 | Chien et al. | |
| 2013/0064296 A1 | 3/2013 | Sun et al. | |
| 2013/0114716 A1* | 5/2013 | Gao | H04N 19/91 375/240.14 |
| 2013/0163664 A1* | 6/2013 | Guo | H04N 19/157 375/240.12 |
| 2013/0215963 A1* | 8/2013 | Yie | H04N 19/176 375/240.03 |
| 2014/0133558 A1 | 5/2014 | Seregin et al. | |
| 2014/0205006 A1 | 7/2014 | Jeong et al. | |
| 2015/0078447 A1* | 3/2015 | Gamei | H04N 19/129 375/240.12 |
| 2015/0208090 A1 | 7/2015 | Sakakibara et al. | |
| 2016/0044310 A1 | 2/2016 | Park et al. | |
| 2016/0219290 A1 | 7/2016 | Zhao et al. | |
| 2017/0094285 A1 | 3/2017 | Said et al. | |
| 2017/0094313 A1 | 3/2017 | Zhao et al. | |
| 2017/0094314 A1 | 3/2017 | Zhao et al. | |
| 2017/0332084 A1 | 11/2017 | Seregin et al. | |
| 2017/0353719 A1* | 12/2017 | Liu | H04N 19/176 |
| 2018/0098064 A1 | 4/2018 | Seregin et al. | |
| 2020/0021801 A1* | 1/2020 | Jeong | H04N 19/105 |
| 2020/0195935 A1 | 6/2020 | Seregin et al. | |
| 2021/0195195 A1* | 6/2021 | Zhao | H04N 19/103 |

FOREIGN PATENT DOCUMENTS

| | | |
|---|---|---|
| CN | 102918844 A | 2/2013 |
| CN | 103229507 A | 7/2013 |
| CN | 103262542 A | 8/2013 |
| CN | 103299622 A | 9/2013 |
| CN | 103765892 A | 4/2014 |
| CN | 103959789 A | 7/2014 |
| EP | 2635030 A2 | 9/2013 |
| EP | 2723077 A1 | 4/2014 |
| EP | 2728883 A2 | 5/2014 |
| JP | 2012147268 A | 8/2012 |
| JP | 2013541303 A | 11/2013 |
| JP | 2014523697 A | 9/2014 |
| KR | 20090066035 A | 6/2009 |
| WO | WO-2012044840 A1 | 4/2012 |
| WO | 2012119569 A1 | 9/2012 |
| WO | 2012167119 A1 | 12/2012 |
| WO | 2012171463 A1 | 12/2012 |
| WO | 2013067334 A2 | 5/2013 |
| WO | WO-2014054267 A1 | 4/2014 |

OTHER PUBLICATIONS

Chen J., et al., "Algorithm Description of Joint Exploration Test Model 2 (JEM2)," 114 MPEG Meeting, Feb. 22, 2016-Feb. 26, 2016; (Motion Picture Expert Group or ISO/IEC/JTC1/SC29/WG11), No. N16066, Apr. 4, 2016, XP030022739, 33 pages.

Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting, Document No. JVET-B1001_v1, Feb. 20-26, 2016, 31 pp.

Chen J., et al., "Algorithm Description of Joint Exploration Test Model 6 {JEM 6}," Joint Video Exploration Team (JVET) of ITU-T SG 16 WP 3 and ISO/IEC JTC 1/SC 29/WG 11, 6th Meeting; Hobart, AU, Mar. 31-Apr. 7, 2017, Document: JVET-F1001-v3, Jun. 30, 2017, 48 pp.

Chen J., et al., "Algorithm Description of Joint Exploration Test Model 3," Document: JVET-C1001_v3, Joint Video Exploration Team (JVET) of ITU-T SG 16 WP 3 and ISO/IEC JTC 1/SC 29/WG 11, 3rd Meeting: Geneva, CH, May 26-Jun. 1, 2016, 37 Pages.

Flynn D., et al., "High Efficiency Video Coding (HEVC) Range Extensions text specification: Draft7," JCT-VC meeting, MPEG meeting; Mar. 27-Apr. 14, 2014; Incheon, KR; (Joint Collaborative Team on Video Coding of ISO/IEC JTC1/SC29/WG11 and ITU-T SG.16); Document: JCTVC-Q1005_v4, 376 pp.

Han, et al., "Improvements to Intra Prediction Mode Coding," Joint Video Exploration Team (JVET) of ITU-T SG16 WP3 and ISO/IEC JTC1/SC29/WG11; 7th Meeting; Torino, IT, Jul. 13-21, 2017, document No. JVET-G0060, Jul. 5, 2017, 4 pp.

Huang H., "EE2.1: Quadtree plus binary tree structure integration with JEM tools," Joint Video Exploration Team (JVET) of ITU-T SG 16 WP 3 and ISO/IEC JTC 1/SC 29/WG 11, 3rd Meeting: Geneva, CH, May 26-Jun. 1, 2016, JVET-C0024, 5 pp.

International Preliminary Report on Patentability—PCT/US2017/055162, The International Bureau of WIPO—Geneva, Switzerland, dated Apr. 18, 2019, 11 pages.

International Search Report and Written Opinion—PCT/US2017/055162—ISA/EPO—dated Feb. 5, 2018.

ITU-T H.223, Series H: Audiovisual and Multimedia Systems, Infrastructure of Audiovisual Services—Transmission Multiplexing and Synchronization, Multiplexing Protocol for Low Bit Rate Multimedia Communication, The International Telecommunication Union, Jul. 2001, 74 pp.

"ITU-T H.265, Series H: Audiovisual and Multimedia Systems, Infrastructure of audiovisual services—Coding of moving video. High efficiency video coding," The International Telecommunication Union, Apr. 2015, 634 pp, please consider section 7.4.9.6 on p. 102, section 8.5.3.2.6 on p. 141, section 8.5.3.2.7 on pp. 141-145, and section 8.5.3.2.8 on p. 145.

Kim S-H., et al., "Further improvement of intra coding tools," Joint Video Exploration Team (JVET) of ITU-T SG 16 WP 3 and

(56) References Cited

OTHER PUBLICATIONS

ISO/IEC JTC 1/SC 29/WG 11, 2nd Meeting; San Diego, USA, Feb. 20-26, 2016, document No. JVET-B0051, San Diego, USA, Feb. 20, 2016, pp. 1-5.

Partial International Search Report—PCT/US2017/055162—ISA/EPO—dated Dec. 13, 2017.

Sekiguchi S., et al., "Improved Entropy Coding for Intra Prediction Modes," 17th JVT Meeting, 74 MPEG Meeting, (Joint Video Team of ISO/IEC JTC1/SC29/WG11 and ITU-T SG.16), No. JVT-Q032, Oct. 12, 2005, XP030006195, 11 pages.

Seregin et al., "Block Shape Dependent Intra Mode Coding," Joint Video Exploration Team (JVET) of ITU-T SG16 WP3 and ISO/IEC JTC1/SC29/WG11; 7th Meeting; Torino, IT, Jul. 13-21, 2017, document No. JVET-G0159, Jul. 16, 2017, 3 pp.

Seregin V., et al., "Block Shape Dependent Intra Mode Coding," 4 JVET Meeting, Chengdu, (The Joint Video Exploration Team of ISO/IEC JTC1/SC29/WG11 and ITU-T SG.16), URL: http://phenix.int-evry.fr/jvet/,,No. JVET-D0114-v3, Oct. 15, 2016, XP030150362, 3 pages.

Seregin V., et al., "Variable Number of Intra Modes," 4. JVET Meeting; Oct. 15, 2016-Oct. 21, 2016; Chengdu; (The Joint Video Exploration Team of ISO/IEC JTC1/SC29/WG11 and ITU-T SG.16); URL: http://phenix.int-evry.fr/jvet/, No. JVET-D0113, Oct. 6, 2016 (Oct. 6, 2016), XP030150359, pp. 1-2.

Seregin V., et al., "Neighbor based intra most probable modes list derivation," JVET Meeting; Geneva, CH; May 26, 2016-Jan. 6, 2016; (The Joint Video Exploration Team of ISO/IEC JTC1/SC29/WG11 and ITU-T SG.16), JVET-C0055, 16, May 2016; 4 pp.

Suehring K., et al., "JVET common test conditions and software reference configurations," Joint Video Exploration Team (JVET) of ITU-T SG16 WP3 and ISO/IEC JTC1/SC29/WG11, 2nd Meeting: San Diego, USA, Feb. 20-26, 2016, Document: JVET-B1010, 4 pages.

Wang Y., et al., "High Efficiency Video Coding (HEVC) Defect Report 2," JCT-VC Meeting; Oct. 23-Nov. 1, 2013; San Jose; (Joint Collaborative Team on Video Coding of ISO/IEC JTC1/SC29/WG11 and ITU-T SG.16); No. JCTVC-O1003_v2; Nov. 24, 2013; 311 pp.

Seregin V., et al., "Block Shape Dependent Intra Mode Coding", 4 JVET Meeting, Chengdu, (The Joint Video Exploration Team of ISO/IEC JTC1/SC29/WG11 and ITU-T SG.16), URL: http://phenix.int-evry.fr/jvet/, No. JVET-D0114, 15-21, Oct. 2016, XP030150361, Oct. 6, 2016 (Oct. 6, 2016), 3 pages.

Bross B., et al., "WD5: Working Draft 5 of High-Efficiency Video Coding", JCTVC-G1103_d9, Joint Collaborative Team on Video Coding (JCT-VC) of ITU-T SG16 WP3 and ISO/IEC JTC1/SC29/WG11, 7th Meeting: Geneva, CH, Nov. 21-30, 2011, 238 Pages.

Prosecution History from U.S. Appl. No. 15/590,261, dated Oct. 25, 2018 through Jan. 8, 2020, 60] 22 Pages.

Chen J., et al., "Algorithm Description of Joint Exploration Test Model 2," Joint Video Exploration Team (JVET) of ITU-T SG 16 WP 3 and ISO/IEC JTC 1/SC 29/WG 11, 2nd Meeting, San Diego, CA, USA, Feb. 20-26, 2016, [JVET-B1001_v3], Mar. 25, 2016 (Mar. 25, 2016), 32 Pages, JVET-B1001 (Version 3), pp. 6-7.

Maani E., et al., "Intra Mode Coding using Logical Mode Numbering," Joint Collaborative Team on Video Coding (JCT-VC) of ITU-TSG16 WP3 and ISO/IEC JTC1/SC29/WG11, 8th Meeting: San Jose, CA, USA, Feb. 1-10, 2012, [JCTVC-H0407], Feb. 5, 2012, JCTVC-H0407 (version3), pp. 1-5.

* cited by examiner

VARIABLE NUMBER OF INTRA MODES FOR VIDEO CODING

This application is a continuation of U.S. application Ser. No. 15/723,950, filed Oct. 3, 2017, which claims the benefit of U.S. Provisional Application No. 62/404,128, filed 4 Oct. 2016, the entire contents of both of which are incorporated by reference herein.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the recently finalized High Efficiency Video Coding (HEVC) standard, and extensions of such standards. The video devices may transmit, receive, encode, decode, and/or store digital video information more efficiently by implementing such video compression techniques.

Video compression techniques perform spatial (intra-picture) prediction and/or temporal (inter-picture) prediction to reduce or remove redundancy inherent in video sequences. For block-based video coding, a video slice (i.e., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

This disclosure describes techniques related to intra prediction and, more particularly, to the signalling of intra prediction modes from a video encoder to a video decoder.

In one example, a method for coding video data includes determining a first block of the video data is intra mode coded, wherein the first block of the video data has a first height and a first width; based on the first height and the first width, identifying a group of N available intra prediction modes for the first block of video data, wherein N is an integer value greater than two; selecting from the group of N available intra prediction modes, a first intra prediction mode used to code the first block of the video data; and coding the first block using the first intra prediction mode.

In another example, a device for coding video data includes a memory configured to store the video data and one or more processors configured to determine a first block of the video data is intra mode coded, wherein the first block of the video data has a first height and a first width; based on the first height and the first width, identify a group of N available intra prediction modes for the first block of video data, wherein N is an integer value greater than two; select from the group of N available intra prediction modes, a first intra prediction mode used to code the first block of the video data; and code the first block using the first intra prediction mode.

In another example, a method for coding video data includes determining a block of the video data is intra mode coded; generating a first most probable mode (MPM) candidate list for the block; coding a first flag indicating an actual intra prediction mode used to code the block is not included in the first MPM candidate list; generating a second MPM candidate list for the block, wherein generating the second MPM candidate list for the block comprises: deriving at least one candidate intra prediction mode for inclusion in the second MPM candidate list based on an intra prediction mode in the first MPM candidate list; and coding a second flag indicating whether an actual intra prediction mode used to code the block is included in the second MPM candidate list.

In another example, a device for coding video data includes a memory configured to store the video data; and one or more processors configured to determine a block of the video data is intra mode coded; generate a first most probable mode (MPM) candidate list for the block; code a first flag indicating an actual intra prediction mode used to code the block is not included in the first MPM candidate list; generate a second MPM candidate list for the block, wherein generating the second MPM candidate list for the block comprises: derive at least one candidate intra prediction mode for inclusion in the second MPM candidate list based on an intra prediction mode in the first MPM candidate list; and code a second flag indicating whether an actual intra prediction mode used to code the block is included in the second MPM candidate list.

The details of one or more aspects of the disclosure are set forth in the accompanying drawings and the description below. Other features, objects, and advantages of the techniques described in this disclosure will be apparent from the description and drawings, and from the claims.

DETAILED DESCRIPTION

Figure 1:
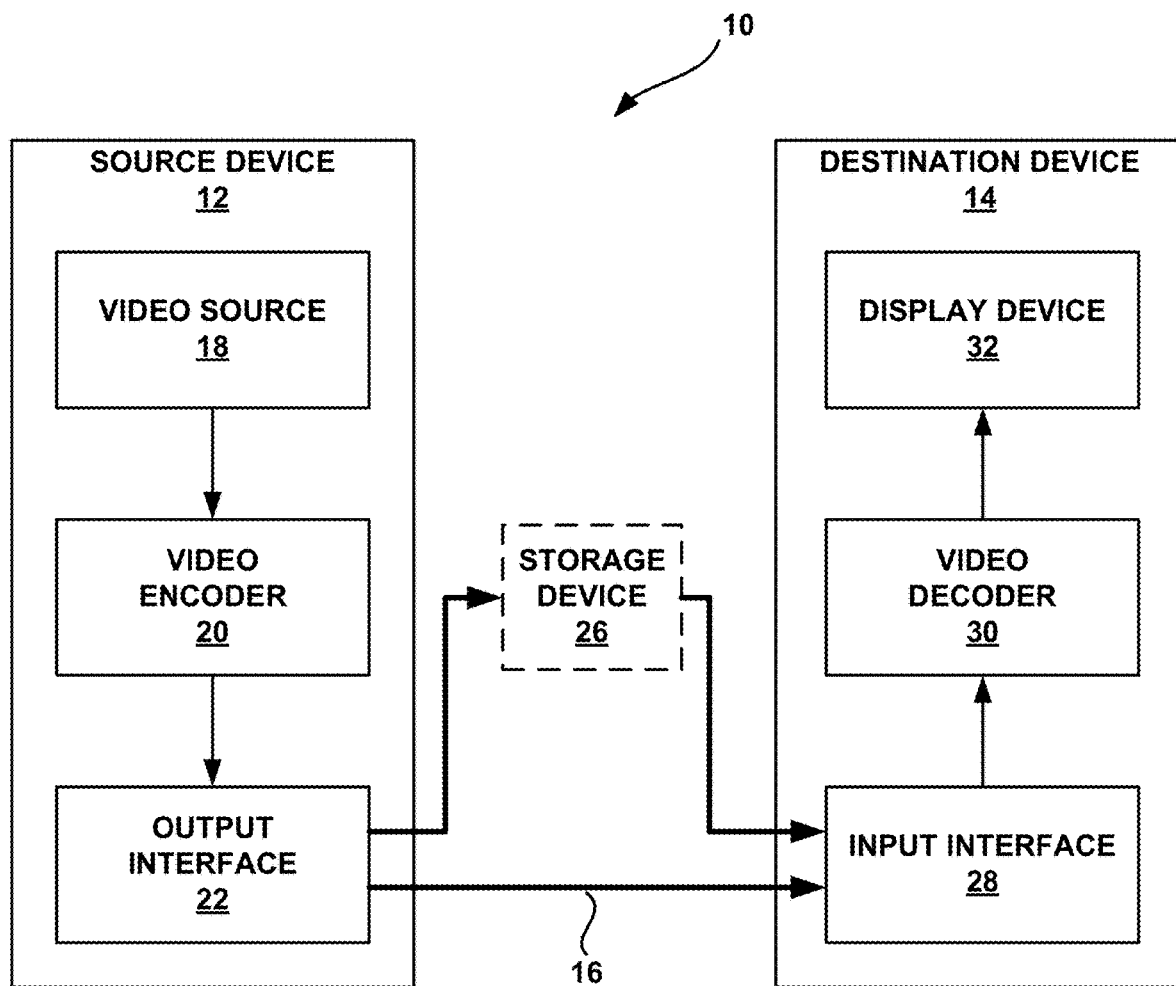
FIG. 1 is a block diagram illustrating an example video encoding and decoding system that may utilize the techniques described in this disclosure.

Various video coding standards, including the recently developed High Efficiency Video Coding (HEVC) standard include predictive coding modes for video blocks, where a block currently being coded is predicted based on an already coded block of video data. In an intra prediction mode, the current block is predicted based on one or more previously coded, neighboring blocks in the same picture as the current block, while in an inter prediction mode the current block is predicted based on an already coded block in a different picture. In inter prediction mode, the process of determining a block of a previously coded picture to use as a predictive block is sometimes referred to as motion estimation, which is generally performed by a video encoder, and the process of identifying and retrieving a predictive block is sometimes referred to as motion compensation, which is performed by both video encoders and video decoders. Extensions of HEVC and successors to HEVC may also use additional coding modes, such as intra block copy, dictionary, and palette coding modes.

This disclosure describes techniques related to intra prediction and, more particularly, to the selection of the prediction directions (i.e., the intra prediction modes) and coding of the prediction directions. The techniques of this disclosure may be used in conjunction with any of the existing video codecs, such as HEVC, or may be an efficient coding tool for use in future video coding technology with compression capability that may exceed that of the current HEVC standard and its extensions. The techniques of this disclosure may, for example, be used in conjunction with the H.266 standard presently under development or other successor standards to HEVC.

This disclosure may at times refer to a video coder. Video coder is intended to be a generic term that refers to either video encoding or video decoding. Likewise, the term video coding is intended to be a generic term that refers to either video encoding or video decoding. Certain techniques of this disclosure may be described with respect to either video encoding or video decoding, but unless explicitly stated otherwise, it should not be assumed that those techniques are not equally applicable to the other of video encoding or video decoding. This disclosure, for example, describes techniques for generating most probable mode (MPM) candidate lists and for determining contexts for entropy coding certain information associated with the MPM candidate lists. The techniques for generating the MPM candidate list and determining the contexts are performed by both a video encoder and a video decoder, such that the video decoder can determine the same MPM candidate list or the same context as the video encoder with little or no explicit signaling from the video encoder to the video decoder. Thus, even if certain techniques of this disclosure are described with respect to one of a video encoder or video decoder, the techniques should generally be assumed to also be applicable to the other of the video encoder or video decoder.

This disclosure may also use terms such as current block, current picture, etc. In the context of this disclosure, the term current is intended to identify a block or picture that is currently being coded, as opposed to, for example, previously or already coded block or picture, or a yet to be coded block or picture.

FIG. 1 is a block diagram illustrating an example video encoding and decoding system 10 that may utilize the techniques described in this disclosure. As shown in FIG. 1, system 10 includes a source device 12 that generates encoded video data to be decoded at a later time by a destination device 14. Source device 12 and destination device 14 may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via a link 16. Link 16 may comprise any type of medium or device capable of moving the encoded video data from source device 12 to destination device 14. In one example, link 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In another example, encoded data may be output from output interface 22 to a storage device 26. Similarly, encoded data may be accessed from storage device 26 by input interface. Storage device 26 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, storage device 26 may correspond to a file server or another intermediate storage device that may hold the encoded video generated by source device 12. Destination device 14 may access stored video data from storage device 26 via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from storage device 26 may be a streaming transmission, a download transmission, or a combination of both.

The techniques of this disclosure are not necessarily limited to wireless applications or settings. The techniques may be applied to video coding in support of any of a variety of multimedia applications, such as over-the-air television broadcasts, cable television transmissions, satellite television transmissions, streaming video transmissions, e.g., via the Internet, encoding of digital video for storage on a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes a video source 18, video encoder 20 and an output interface 22. In some cases, output interface 22 may include a modulator/demodulator (modem) and/or a transmitter. In source device 12, video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if video source 18 is a video camera, source device 12 and destination device 14 may form so-called camera phones or video phones. However, the techniques described in this disclosure may be applicable to video coding in general, and may be applied to wireless and/or wired applications.

The captured, pre-captured, or computer-generated video may be encoded by video encoder 20. The encoded video data may be transmitted directly to destination device 14 via output interface 22 of source device 12. The encoded video data may also (or alternatively) be stored onto storage device 26 for later access by destination device 14 or other devices, for decoding and/or playback.

Destination device 14 includes an input interface 28, a video decoder 30, and a display device 32. In some cases, input interface 28 may include a receiver and/or a modem. Input interface 28 of destination device 14 receives the encoded video data over link 16. The encoded video data communicated over link 16, or provided on storage device 26, may include a variety of syntax elements generated by video encoder 20 for use by a video decoder, such as video decoder 30, in decoding the video data. Such syntax elements may be included with the encoded video data transmitted on a communication medium, stored on a storage medium, or stored a file server.

Display device 32 may be integrated with, or external to, destination device 14. In some examples, destination device 14 may include an integrated display device and also be configured to interface with an external display device. In other examples, destination device 14 may be a display device. In general, display device 32 displays the decoded video data to a user, and may comprise any of a variety of display devices such as a liquid crystal display (LCD), a plasma display, an organic light emitting diode (OLED) display, or another type of display device.

Video encoder 20 and video decoder 30 may operate according to a video compression standard, such as the recently finalized HEVC standard. Video encoder 20 and video decoder 30 may additionally operate according to an HEVC extension, such as the range extension, the multiview extension (MV-HEVC), or the scalable extension (SHVC) which have been developed by the Joint Collaboration Team on Video Coding (JCT-VC) as well as Joint Collaboration Team on 3D Video Coding Extension Development (JCT-3V) of ITU-T Video Coding Experts Group (VCEG) and ISO/IEC Motion Picture Experts Group (MPEG).

Video encoder 20 and video decoder 30 may also operate according to other proprietary or industry standards, such as the ITU-T H.264 standard, alternatively referred to as ISO/IEC MPEG-4, Part 10, Advanced Video Coding (AVC), or extensions of such standards, such as the Scalable Video Coding (SVC) and Multi-view Video Coding (MVC) extensions. The techniques of this disclosure, however, are not limited to any particular coding standard. Other examples of video compression standards include ITU-T H.261, ISO/IEC MPEG-1 Visual, ITU-T H.262 or ISO/IEC MPEG-2 Visual, ITU-T H.263, and ISO/IEC MPEG-4 Visual.

ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate proposed compression technology designs. The JVET first met during 19-21 Oct. 2015. One version of reference software, i.e., Joint Exploration Model 2 (JEM 2) can be downloaded from: https://jvet.hhi.fraunhofer.de/svn/svn_HMJEMSoftware/tags/HM-16.6-JEM-2.0/. An algorithm for JEM2 is described in J. Chen, E. Alshina, G. J. Sullivan, J.-R. Ohm, J. Boyce, "Algorithm description of Joint Exploration Test Model 2," JVET-B1001, San Diego, March 2016, which description is incorporated herein by reference. Another version of the reference software, i.e., Joint Exploration Model 3 (JEM 3) can be downloaded from: https://jvet.hhi.fraunhofer.de/svn/svn_HMJEMSoftware/tags/HM-16.6-JEM-3.0/. The Algorithm description for JEM3 is described in J. Chen, E. Alshina, G. J. Sullivan, J.-R. Ohm, J. Boyce, "Algorithm description of Joint Exploration Test Model 3," JVET-C1001, Geneva, 26 May to 1 Jun. 2016, and is incorporated herein by reference.

Techniques of this disclosure may utilize HEVC terminology for ease of explanation. It should not be assumed, however, that the techniques of this disclosure are limited to HEVC, and in fact, it is explicitly contemplated that the techniques of this disclosure may be implemented in successor standards to HEVC and its extensions.

Although not shown in FIG. 1, in some examples, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device.

In HEVC and other video coding specifications, a video sequence typically includes a series of pictures. Pictures may also be referred to as "frames." In one example approach, a picture may include three sample arrays, denoted $S_L$, $S_{Cb}$, and $S_{Cr}$. In such an example approach, $S_L$ is a two-dimensional array (i.e., a block) of luma samples. $S_{Cb}$ is a two-dimensional array of Cb chrominance samples. $S_{Cr}$ is a two-dimensional array of Cr chrominance samples. Chrominance samples may also be referred to herein as "chroma" samples. In other instances, a picture may be monochrome and may only include an array of luma samples.

To generate an encoded representation of a picture, video encoder 20 may generate a set of coding tree units (CTUs). Each of the CTUs may comprise a coding tree block of luma samples, two corresponding coding tree blocks of chroma samples, and syntax structures used to code the samples of the coding tree blocks. In monochrome pictures or pictures having three separate color planes, a CTU may comprise a single coding tree block and syntax structures used to code the samples of the coding tree block. A coding tree block may be an N×N block of samples. A CTU may also be referred to as a "tree block" or a "largest coding unit" (LCU). The CTUs of HEVC may be broadly analogous to the macroblocks of other standards, such as H.264/AVC. However, a CTU is not necessarily limited to a particular size and may include one or more coding units (CUs). A slice may include an integer number of CTUs ordered consecutively in a raster scan order.

To generate a coded CTU, video encoder 20 may recursively perform quad-tree partitioning on the coding tree blocks of a CTU to divide the coding tree blocks into coding blocks, hence the name "coding tree units." A coding block may be an N×N block of samples. A CU may comprise a coding block of luma samples and two corresponding coding blocks of chroma samples of a picture that has a luma sample array, a Cb sample array, and a Cr sample array, and syntax structures used to code the samples of the coding blocks. In monochrome pictures or pictures having three separate color planes, a CU may comprise a single coding block and syntax structures used to code the samples of the coding block.

Video encoder 20 may partition a coding block of a CU into one or more prediction blocks. A prediction block is a rectangular (i.e., square or non-square) block of samples on which the same prediction is applied. A prediction unit (PU) of a CU may comprise a prediction block of luma samples, two corresponding prediction blocks of chroma samples, and syntax structures used to predict the prediction blocks. In monochrome pictures or pictures having three separate color planes, a PU may comprise a single prediction block and syntax structures used to predict the prediction block.

Video encoder 20 may generate predictive luma, Cb, and Cr blocks for luma, Cb, and Cr prediction blocks of each PU of the CU.

Video encoder 20 may use intra prediction or inter prediction to generate the predictive blocks for a PU. If video encoder 20 uses intra prediction to generate the predictive blocks of a PU, video encoder 20 may generate the predictive blocks of the PU based on decoded samples of the picture associated with the PU. If video encoder 20 uses inter prediction to generate the predictive blocks of a PU, video encoder 20 may generate the predictive blocks of the PU based on decoded samples of one or more pictures other than the picture associated with the PU.

After video encoder 20 generates predictive luma, Cb, and Cr blocks for one or more PUs of a CU, video encoder 20 may generate a luma residual block for the CU. Each sample in the CU's luma residual block indicates a difference between a luma sample in one of the CU's predictive luma blocks and a corresponding sample in the CU's original luma coding block. In addition, video encoder 20 may generate a Cb residual block for the CU. Each sample in the CU's Cb residual block may indicate a difference between a Cb sample in one of the CU's predictive Cb blocks and a corresponding sample in the CU's original Cb coding block. Video encoder 20 may also generate a Cr residual block for the CU. Each sample in the CU's Cr residual block may indicate a difference between a Cr sample in one of the CU's predictive Cr blocks and a corresponding sample in the CU's original Cr coding block.

Furthermore, video encoder 20 may use quad-tree partitioning to decompose the luma, Cb, and Cr residual blocks of a CU into one or more luma, Cb, and Cr transform blocks. A transform block is a rectangular (e.g., square or non-square) block of samples on which the same transform is applied. A transform unit (TU) of a CU may comprise a transform block of luma samples, two corresponding transform blocks of chroma samples, and syntax structures used to transform the transform block samples. Thus, each TU of a CU may be associated with a luma transform block, a Cb transform block, and a Cr transform block. The luma transform block associated with the TU may be a sub-block of the CU's luma residual block. The Cb transform block may be a sub-block of the CU's Cb residual block. The Cr transform block may be a sub-block of the CU's Cr residual block. In monochrome pictures or pictures having three separate color planes, a TU may comprise a single transform block and syntax structures used to transform the samples of the transform block.

Video encoder 20 may apply one or more transforms to a luma transform block of a TU to generate a luma coefficient block for the TU. A coefficient block may be a two-dimensional array of transform coefficients. A transform coefficient may be a scalar quantity. Video encoder 20 may apply one or more transforms to a Cb transform block of a TU to generate a Cb coefficient block for the TU. Video encoder 20 may apply one or more transforms to a Cr transform block of a TU to generate a Cr coefficient block for the TU.

After generating a coefficient block (e.g., a luma coefficient block, a Cb coefficient block or a Cr coefficient block), video encoder 20 may quantize the coefficient block. Quantization generally refers to a process in which transform coefficients are quantized to possibly reduce the amount of data used to represent the transform coefficients, providing further compression. After video encoder 20 quantizes a coefficient block, video encoder 20 may entropy encode syntax elements indicating the quantized transform coefficients. For example, video encoder 20 may perform Context-Adaptive Binary Arithmetic Coding (CABAC) on the syntax elements indicating the quantized transform coefficients.

Video encoder 20 may output a bitstream that includes a sequence of bits that forms a representation of coded pictures and associated data. The bitstream may comprise a sequence of Network Abstraction Layer (NAL) units. A NAL unit is a syntax structure containing an indication of the type of data in the NAL unit and bytes containing that data in the form of a raw byte sequence payload (RBSP) interspersed as necessary with emulation prevention bits. Each of the NAL units includes a NAL unit header and encapsulates a RBSP. The NAL unit header may include a syntax element that indicates a NAL unit type code. The NAL unit type code specified by the NAL unit header of a NAL unit indicates the type of the NAL unit. An RBSP may be a syntax structure containing an integer number of bytes that is encapsulated within a NAL unit. In some instances, an RB SP includes zero bits.

Different types of NAL units may encapsulate different types of RBSPs. For example, a first type of NAL unit may encapsulate an RBSP for a PPS, a second type of NAL unit may encapsulate an RBSP for a coded slice, a third type of NAL unit may encapsulate an RBSP for SEI messages, and so on. NAL units that encapsulate RBSPs for video coding data (as opposed to RBSPs for parameter sets and SEI messages) may be referred to as VCL NAL units.

Video decoder 30 may receive a bitstream generated by video encoder 20. In addition, video decoder 30 may parse the bitstream to obtain syntax elements from the bitstream. Video decoder 30 may reconstruct the pictures of the video data based at least in part on the syntax elements obtained from the bitstream. The process to reconstruct the video data may be generally reciprocal to the process performed by video encoder 20. In addition, video decoder 30 may inverse quantize coefficient blocks associated with TUs of a current CU. Video decoder 30 may perform inverse transforms on the coefficient blocks to reconstruct transform blocks associated with the TUs of the current CU. Video decoder 30 may reconstruct the coding blocks of the current CU by adding the samples of the predictive blocks for PUs of the current CU to corresponding samples of the transform blocks of the TUs of the current CU. By reconstructing the coding blocks for each CU of a picture, video decoder 30 may reconstruct the picture.

Figure 2:
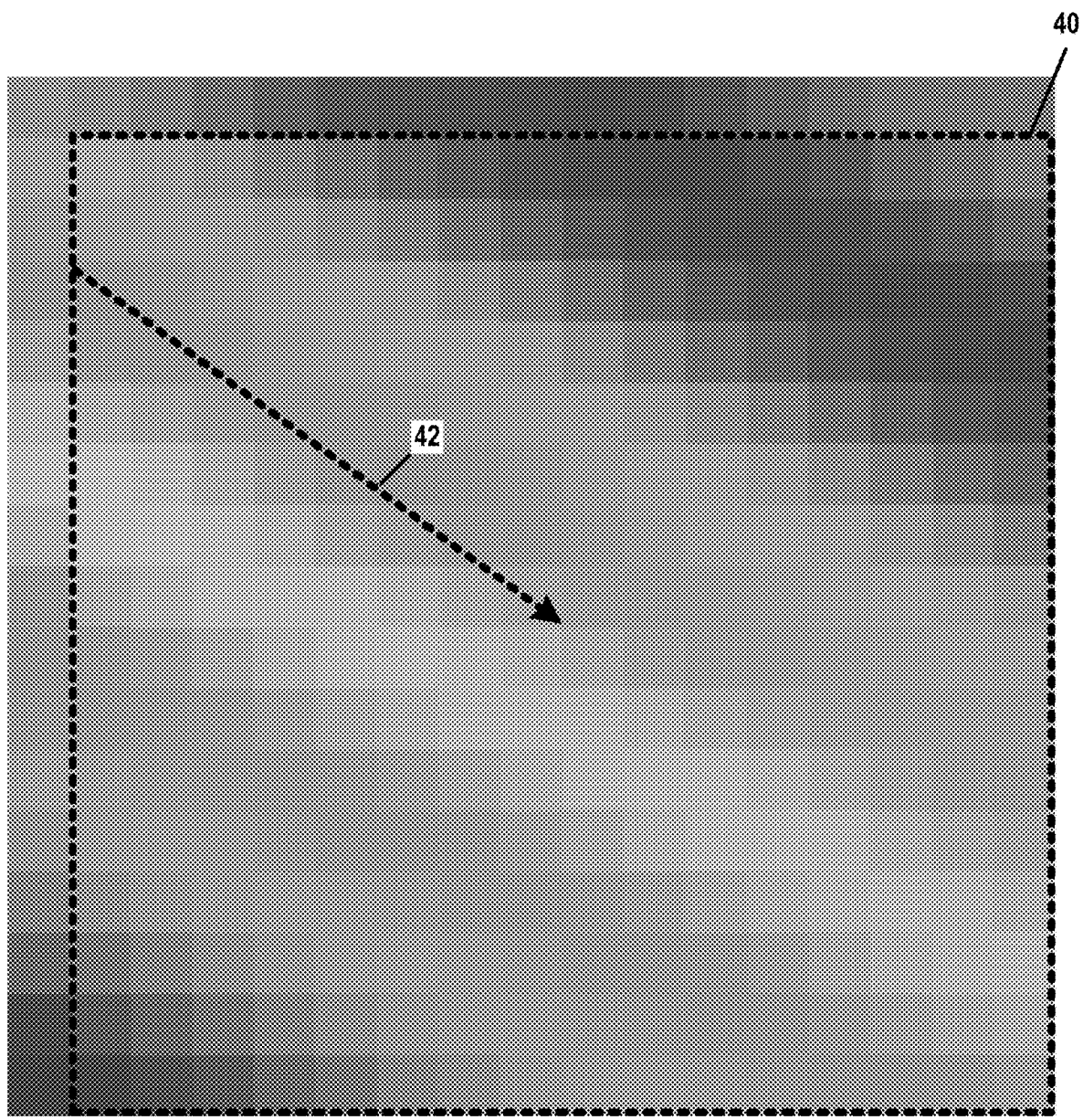
FIG. 2 is a conceptual diagram illustrating an example of intra prediction of a block of video data.

FIG. 2 is a conceptual diagram illustrating an example of intra prediction of a block of video data, as may be performed by video encoder 20 or video decoder 30. For intra prediction, a block of video data (e.g., a PU) is predicted using reconstructed image samples that are spatially neighboring. A typical example of the intra prediction for an image block 40, e.g., a 16×16 image block, is shown in FIG. 2. With intra prediction, video encoder 20 or video decoder 30 predicts image block 40 by copying the above and left neighboring reconstructed samples (reference samples) along a selected prediction direction (as indicated by arrow 42).

Figure 3:
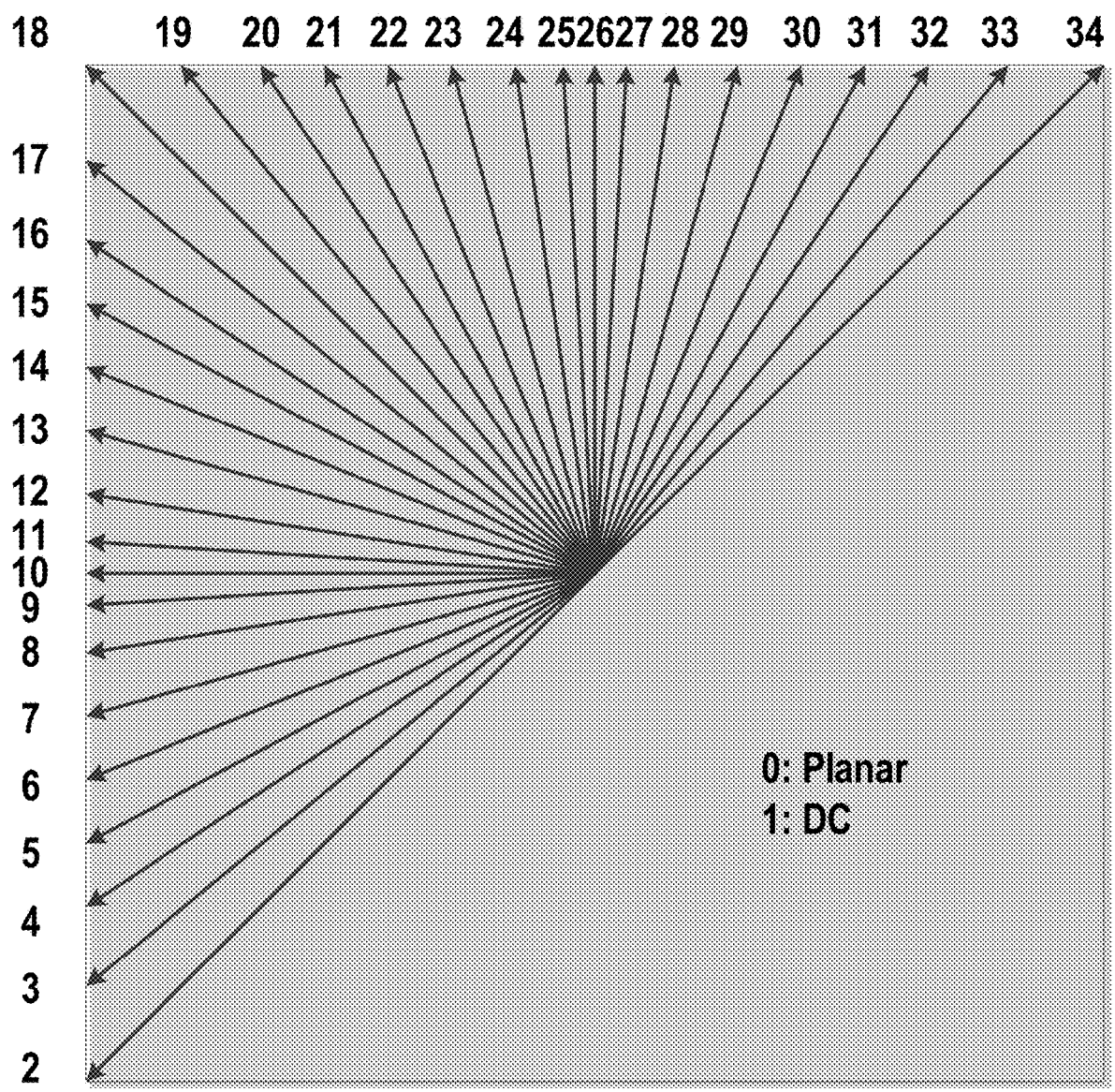
FIG. 3 is a conceptual diagram illustrating an example of intra prediction modes and corresponding mode indexes.

FIG. 3 is a conceptual diagram illustrating an example of the intra prediction modes and corresponding mode indexes used in the HEVC standard. In HEVC, there are 35 modes for the intra prediction of a luma block, including a planar mode (i.e., a planar intra prediction mode), a DC mode, and 33 angular modes (i.e., angular intra prediction modes), as indicated in FIG. 3. The 35 modes of the intra prediction, as defined in HEVC, are indexed as shown in Table 1 below.

TABLE 1

Specification of intra prediction mode and associated names

| Intra prediction mode | Associated name |
|---|---|
| 0 | INTRA_PLANAR |
| 1 | INTRA_DC |
| 2 ... 34 | INTRA_ANGULAR2 ... INTRA_ANGULAR34 |

Figure 4:
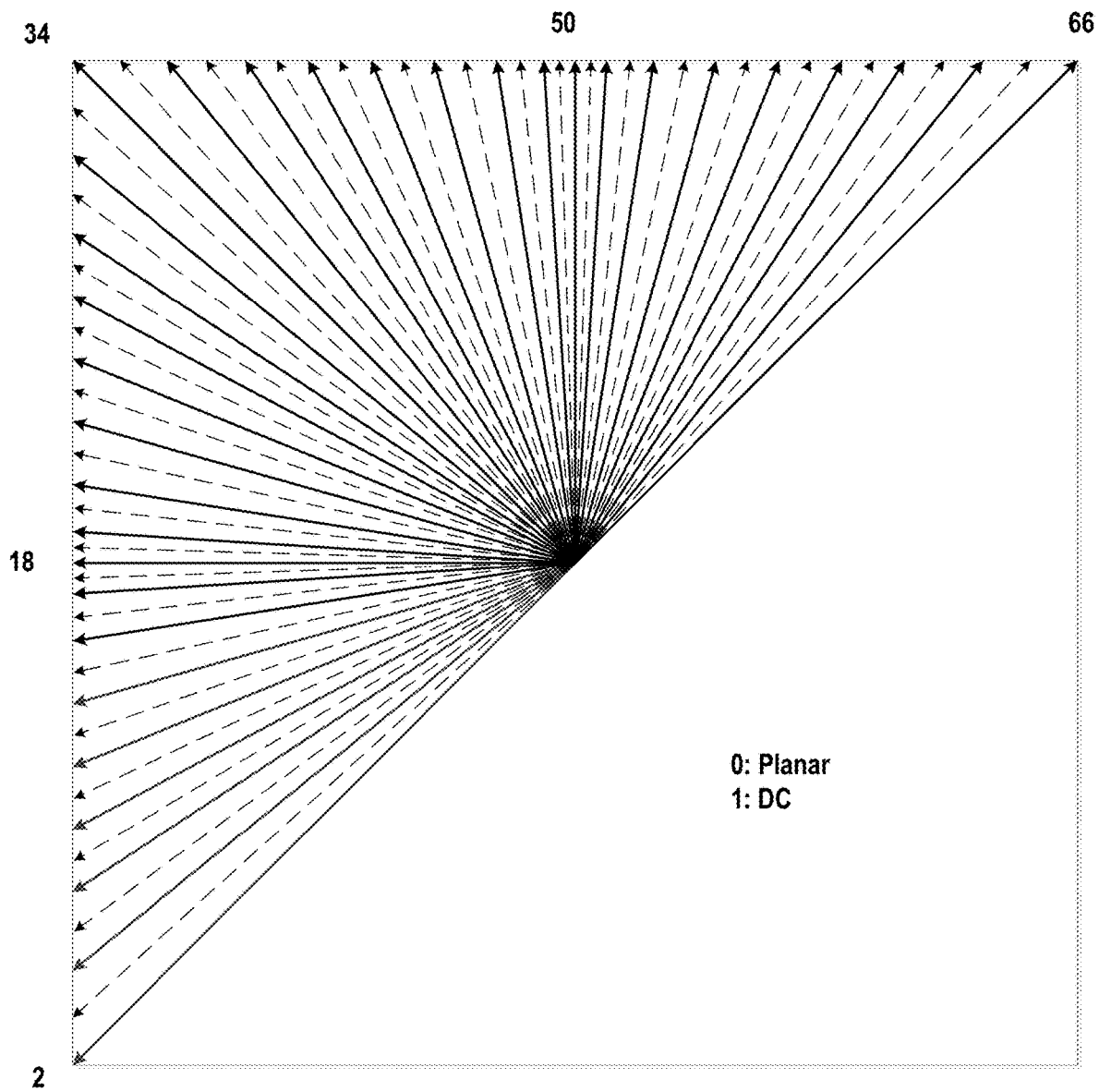
FIG. 4 is a conceptual diagram illustrating an example of intra prediction modes and corresponding mode indexes defined in JEM.

FIG. 4 is a conceptual diagram illustrating an example of intra prediction modes and corresponding mode indexes defined in JEM. One intra related coding tool in JEM-3.0 is the introduction of 67 intra prediction modes, as shown in FIG. 4. Compared to the intra prediction modes in HEVC, 32 additional angular intra prediction angles are introduced, as shown by the dotted lines in FIG. 4. The 33 angular intra prediction modes of HEVC are shown with solid lines. Intra mode index 0 and 1 refer to the same Planar and DC modes in HEVC. Intra mode indexes 2-66 refer to different Intra prediction angles, with indexes 18, 34 and 50 corresponding to the pure horizontal prediction, the diagonal prediction, and the pure vertical prediction, respectively. With 67 intra prediction modes, finer intra prediction accuracy may be achieved relative to the 35 intra prediction modes of HEVC.

To signal an intra mode, video encoder 20 and video decoder 30 may build an MPM list. Video encoder 20 signals a flag indicating whether the actual intra prediction mode used to code the block is one of the modes in the MPM list. If the actual mode is one of the modes in the MPM list, then video encoder 20 may also generate a syntax element indicating the index value for inclusion in a bitstream of encoded video data, where the index value indicates which entry in the MPM list corresponds to the actual intra prediction mode. When decoding the encoded video data, video decoder 30 may decode the flag and the index value to determine the entry in the list that corresponds to the intra prediction mode used to code the block. As video encoder 20 and video decoder 30 are configured to generate the same MPM list, video decoder 30 can determined the intra prediction mode used by video encoder 20 to encode the block. If the actual intra mode used to code the block is not from the selected modes of the MPM list, then video encoder 20 may explicitly signal the mode index of the mode used to code the block. The maximum value of the mode index may be reduced by removing NIPMs and selected modes. The list of selected modes may, for example, be built by taking every 4-th mode, i.e. uniformly sampled.

The current implementation for intra prediction mode signaling in JEM potentially has some problems that may be addressed by aspects of this disclosure. As one example, although the number of intra angular directions in JEM is doubled compared to the number of intra angular directions to HEVC, more fine prediction directions may still be desired. Increasing the number of directions for smaller block sizes, however, may not improve prediction quality significantly and may, in fact, undesirably increase signaling overhead. In JEM, an MPM list with uniformly sampled selected modes may not most effectively represent the best intra prediction modes for a particular block because such an MPM list is not dependent on neighbors or already chosen MPM list. In JEM, the number of intra modes has been increased, which may also increase intra mode signaling cost. In JEM, rectangular blocks are enabled for intra prediction, but JEM does not consider block shape and corresponding edge features for intra mode signaling. As another example of a potential problem, as more angular intra modes are introduced, the context model for MPM index may need to be further refined.

To potentially address the problems mentioned above, this disclosure introduces several techniques related to intra prediction modes and the signaling of intra prediction modes. The disclosed techniques may be applied individually or, unless stated to the contrary, may also be applied in any combination. The following techniques may be applied by either video encoder 20 or video decoder 30. In some instances, video decoder 30 may perform a decoding process that is reciprocal to an encoding processing performed by video encoder 20. As one example, if video encoder 20 transmits certain information, then video decoder 30 may receive such information. In the case of building MPM lists, video encoder 20 and video decoder 30 may perform the same techniques in order to build the same lists.

Figure 5:
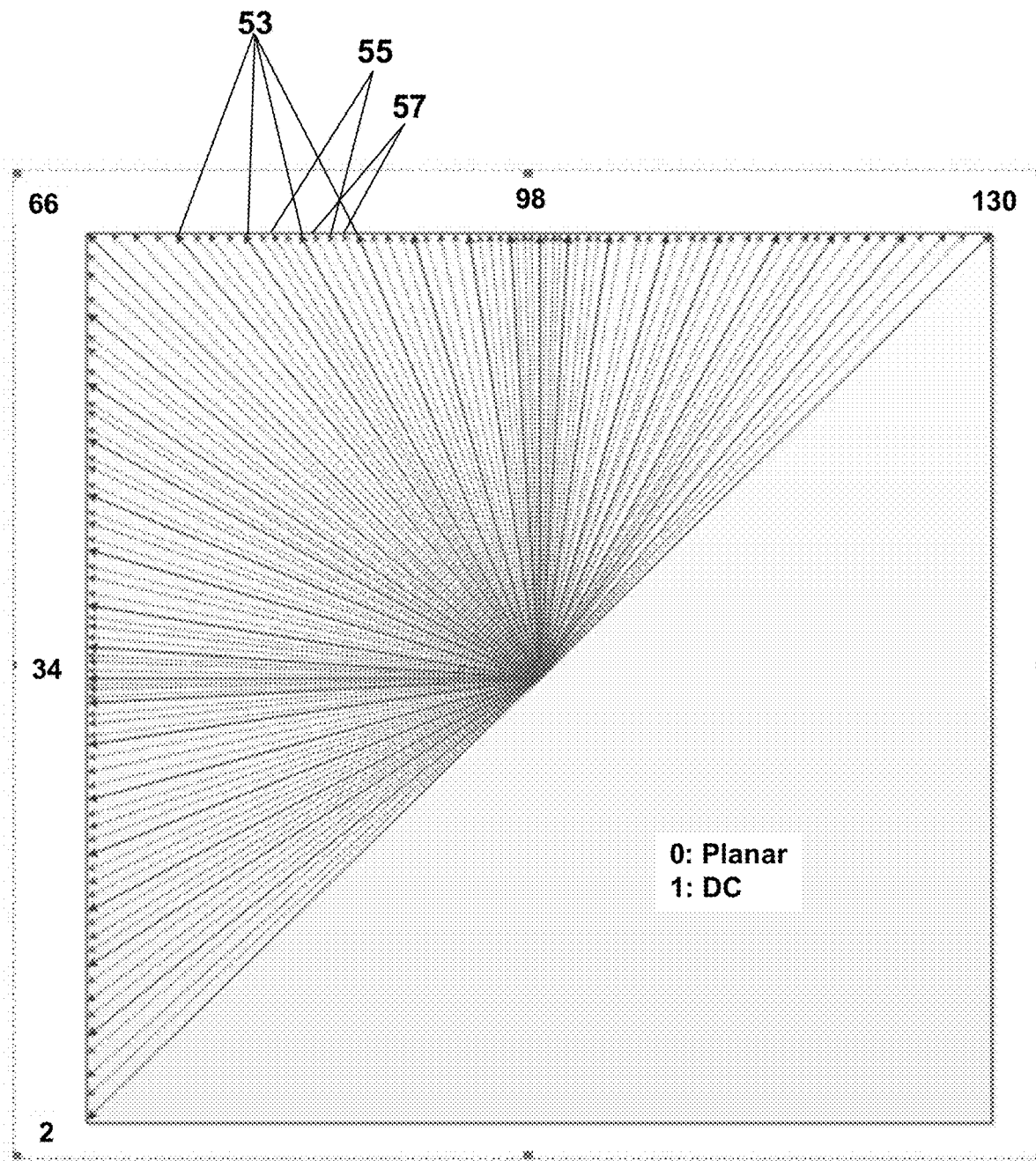
FIG. 5 is a conceptual diagram illustrating an example of intra prediction modes defined in JEM according to an example of the present disclosure.

According to the techniques of this disclosure, video encoder 20 and video decoder 30 may configured to use a variable number of intra modes, such that not all intra coded blocks have the same available intra modes. FIG. 5 is a conceptual diagram illustrating an example of intra prediction modes that could be included in JEM according to an example of the present disclosure. FIG. 5 shows the 131 intra modes introduced by this disclosure. The numbers 2, 34, 66, 98, and 130 in FIG. 5 represent mode indexes for angular modes, and the numbers 0 and 1 represent mode indexes for the planar and DC modes respectively. Although not shown explicitly in FIG. 5, the other angular modes also have associated indexes. The solid lines (e.g., the modes labeled with reference numeral 53) represent the 35 modes in HEVC (33 angular modes, plus DC and planar). The current implementation of JEM utilizes 67 intra modes, with the additional modes corresponding to additional angular modes in between the 33 HEVC angular modes. The modes labeled with reference numerals 55 are examples of the additional modes included in the current version of JEM. This disclosure proposes adding additional modes between the 33 HEVC angular modes and the additional 32 JEM angular modes. The modes labeled with reference numeral 57 are examples of the additional angular modes proposed by this disclosure.

However, merely increasing the number of intra mode prediction directions may not be helpful for improving the coding performance since the increased number of directions also increases the overhead signaling due to the additional variability. Secondly, more variety in intra mode directions may not be efficient for all block sizes. For example, for small block sizes, fewer intra directions may be preferable with less overhead, and for bigger blocks more intra directions may be better.

In one example, video encoder 20 and video decoder 30 may utilize different groupings of modes depending on the size (e.g., the height and width) of the block being coded. The number of intra modes may be signaled per block size, or block area (width*height). The selected number of intra mode directions per block size or block area may be signaled in a video parameter set (VPS), sequence parameter set (SPS), picture parameter set (PPS), slice header, group of blocks, at CTU level, at block level, or elsewhere. In one example, signaling the number of intra mode directions may be done in SPS.

In one example, in order to signal the number of intra modes, video encoder 20 may signal a threshold indicating a block size or block area, and for the blocks smaller or no greater than the threshold, video encoder 20 may use a certain number of intra modes. The threshold may be signaled relative to a default number or as a difference between the threshold to be signaled and the smallest possible block size or area. For example, the smallest block size may be 4×4, so the log 2(block size corresponding to certain number of intra modes)–log 2(4) is signaled. Instead of 4, any other size may be used. Smallest block size in the signaling may depend on the number of intra modes it indicates as it will be described below.

As described above, various block sizes may have different numbers of intra modes. For example, a first threshold indicating block size or block area is signaled, and if the block size or block area is smaller or not greater than the first threshold, the number of intra modes is equal to a first number. For example, the first threshold may be 32 (block area), the signaled value is log 2(32)–log 2(16)=1, 16 is the area of 4×4 block and is considered as the smallest block for the first number of intra modes in this example, and for the blocks with area no greater than the first threshold 32, the first number of intra modes, for example equal to 35 intra modes, may be used.

Similarly, video encoder 20 may signal a second threshold to indicate that the second number of intra modes is used. For example, the second threshold may be set equal to 256, and the signaled value is log 2(256)–log 2(64)=2, 64 is the area of the 8×8 block and is set the smallest for the second number of intra modes in this example, and the second number of intra modes, for example, is set equal to 67 modes. For the blocks being smaller or not greater than the second threshold the second number of intra modes may be used, optionally excluding the blocks, where the number of intra modes was already assigned while doing the comparing against the first threshold.

Other blocks may use default number of intra modes, for example 131 intra modes. The above example can be summarized with the below table.

| Block area (width * height) | 35 modes | 67 modes | 131 modes |
| --- | --- | --- | --- |
| <=32 | X | — | — |
| >32 and <=256 | — | X | — |
| >256 | — | — | X |

In one example, the signaled thresholds may depend on the picture size (e.g., the picture resolution). While two thresholds may be utilized in one example, more or less than two thresholds may be used with other number of intra modes. In another example, the number of intra modes may depend on other decoded information, including but not limited to, block width and/or height, ratio of block width (height) versus height (width), which line(s) of reference samples is used for intra prediction, whether picture dependent prediction combination (PDPC) (as described in U.S. Patent Publication 2017/0094285, published 30 Mar. 2017), enhanced multiple transform (EMT) (as described in U.S. Patent Publication 2016/0219290, published 28 Jul. 2016) or type of primary transform, non-separable secondary transform (NSST) (as described in U.S. Patent Publication 2017/0094313 and U.S. Patent Publication 2017/0094314, both published 30 Mar. 2017) or type of the secondary transform mode is applied or not for current block, whether the current block is coded in an intra slice or inter (P or B) slice, the neighboring reconstructed values, the neighboring intra modes. For example, if most of the neighboring blocks are using planar or DC modes, then the current block may use smaller number of intra modes than the default number for the current block, otherwise, the default number of intra modes are applied for the current block.

In another example, video encoder 20 and video decoder 30 may update the number of intra modes during the encoding and decoding process. For example, a counter may be used to count how frequently MPM modes are being used as a selected intra mode, and if MPM modes are very frequently used, then the total number of intra modes may be reduced (e.g., reduced from 131 to 67), otherwise, if MPM modes are not frequently used, then the total number of intra modes may be increased (e.g., increased from 35 to 67).

The number of MPMs may depend on the total number of intra modes. For example, if the total number of intra modes is equal to a first value, such as 67 for example, then one number of MPMs, such as 6 for example, may be used for intra mode coding. If the total number of intra modes is equal to a second value, such as 131 for example, then the second number of MPMs, such as 7 or 5 MPMs for example, may be used for intra mode coding.

The intra interpolation filter (type and length) used may depend on the total number of intra modes. For example, if the total number of intra modes is equal to a first number, for example 67, a first filter with a certain filter length, such as a 4-tap A cubic interpolation filter for example, may be applied, and then for the total number of intra modes being equal to a second number, such as 131 for example, another filter with another filter length, such as a 6-tap Sextic interpolation filter for example, may be applied.

Mode dependent intra smoothing thresholds may be extended for an increased number of directions, such as by multiplying the threshold by 2 for doubled number of angular directions, for example, when number of intra modes is increased from 67 to 131 modes.

According to the techniques of this disclosure, video encoder 20 and video decoder 30 may be configured to perform intra mode conversion. As more than one number of intra modes may be used, intra modes may need to be converted from one range of intra modes into another range. For example, a current block may use 131 modes, but a neighbor block may use 67 modes. When the MPM list is built for the current block, the intra modes may be mapped to intra modes using the current number of intra modes if the number of intra modes used for the neighbor block is different.

For example, neighbor block may have horizontal mode, the horizontal mode number is 10 with 35 intra modes, 18 with 67 intra modes, and 34 with 131 intra modes. As such, if the neighbor block uses 67 intra mode, video encoder 20 and/or video decoder 30 may map the horizontal mode number 10 or 18, for example, or to 34.

In one example, the chosen subset of intra modes, for example 67 modes from 131 modes, may not include every other second mode (except DC and planar). In other words, the chosen subset may include only 67 modes currently utilizes in JEM and not the additional 64 angular modes proposed by this disclosure. In one example, selecting every other second mode may apply only to angular modes, whereas the planar (mode 0) and DC modes (mode 1) are usually more frequent and may be always included in the smaller subset. In one example, a subset of 67 modes may be selected from 131 modes that best fits with the characteristics of the image, e.g., based on offline experiments and/or training for example. Selecting 67 modes in this fashion may lead to better prediction accuracy, which may lead to improved coding performance. The selected 67 modes may be stored in a look-up table (LUT). The mapping between the larger intra mode set (i.e., 131 modes) to a smaller intra mode set (i.e., 67 modes) and vice versa may be performed using a look-up table. Similar methods may be applied to select a subset of 35 modes from 131 modes and a look-up table may be used to perform this mapping.

Video encoder 20 and/or video decoder 30 may generally perform a mapping or conversion process according to a look-up table, and the input or one index is the mode to be converted and the output or a second index is the converted mode. Conversion may be done in both directions, from a larger intra mode set to a smaller set, or from a smaller set to a larger set. A smaller intra mode set may be a subset of the larger intra mode set, and larger set of intra modes may be a superset of a smaller intra mode set. A subset may be derived, for example, based on the most frequently used modes of the larger set, or based on a neighborhood of the selected directions. Selected directions, for example, may be horizontal, vertical, diagonal or other modes. Some examples of most frequently modes may be the DC mode or planar mode.

In one example, intra modes stored with a block may be set to a mode number represented by the greatest number of intra modes, for example 131 intra modes, even if the block uses less number of intra modes. A mapping or conversion process from a mode, represented by the maximum number of intra modes, to a mode within the desired number of intra modes used for a block may be performed to derive the actual mode.

The mapping or conversion rule may be fixed for video encoder 20 and video decoder 30, or may be indicated in a bitstream, for example, using a list of rules signaling an index. In another example, the conversion rule may be updated during the encoding and decoding process.

In one example, instead of using LUT-based mapping, the mapping process may be based on a closed form expression. To convert a mode represented by 131 number of modes to a mode represented by 67 number of modes, the following may be applied (((mode−2)>>shift)<<shift)+2, by setting shift=1; this will round towards the nearest every second mode, which is closer to zero. The 67 modes would, for example, include the modes referenced by lines 53 and 55 in FIG. 5, but not the modes referenced by lines 57. Similarly, in one example the shift value may be 2 instead of 1, if conversion is done from 131 to 35 modes. In this example, the modes would include the modes referenced by lines 53 in FIG. 5, but not the modes referenced by lines 55 and 57. In another example, an offset value of 1<<(shift−1) may be added before right shift operation to round to the nearest mode. Minus 2 may be added due to number of non-angular modes (DC and planar), since the non-angular modes may not be extended when the number of angular direction is increased, and may be mapped to DC and planar mode, respectively, regardless of the number of intra modes.

In one example, the mapping may be done during MPM list construction, since not all neighbor intra modes may be applicable for the current block. Also, when calculating the derived modes steps in the MPM list derivation, plus or minus 1, for example, may be used for blocks that use all of the 131 intra modes. In another example, plus or minus two may be used for twice smaller number of modes (67), and step plus or minus 4 may be used for four times smaller number of intra modes (35) and so on. The mapping rule, such as the mapping rule that is based on closed form expression or based on LUT, for example, may be applied when steps plus or minus 2, plus or minus 4 are used to calculate the derived modes.

In one example, rather than using a fixed set of smaller intra modes (e.g., 67), adaptive methods may be used to select intra modes while coding. The encoder 20 and the decoder 30 use the same methods to update the intra mode set starting, for example, from an initial set. In one example, video encoder 20 may start from an initial set of intra modes. The initial set may be any set, for example a set learned from offline experiments or from uniformly sampling the larger modes as described above. Then the encoder 20 may keep track of both the frequently and infrequently used coding modes in the larger intra mode set (e.g., 131) that occurred in the already coded region. Then the initial set may be updated by adding the frequently used intra modes and removing the infrequent intra modes. The update process may be performed at various granularity level, for example for each CU, PU, TU, or CTU or group of blocks or units. As the update step is carried out based on the already coded regions, the decoder 30 may follow the same method.

In addition, the intra interpolation filter applied on a current block may depend on the intra mode conversion/ mapping process. Intra mode conversion or mapping may be done for a mode represented by a larger number of intra modes to convert it to a mode represented by a smaller number of intra modes, for example a mode may be mapped from 131 intra modes set to a mode from 67 intra modes set. During the conversion, the intra mode directions of a mode to be mapped and the mapped mode may not necessarily match, such as when an intra mode direction to be mapped is not present in the smaller mode set. However, there may be some other parameter or derivation processes, which are derived or applied based on the intra mode information. In one example, the mode from the larger set may be used to derive such parameters instead of using the mapped or converted intra mode. For example, an intra interpolation filter (for example, used to derive non-integer samples to perform intra prediction) may depend on intra mode, and in such instances, an unconverted mode from a larger intra set may be used to determine the filter. With this intra interpolation filter selection method, the prediction accuracy may be improved, but the total number of intra modes may not be changed.

Furthermore, the above described mapping rule may also be used for other tools related to intra modes, such as PDPC, EMT or primary transform, NSST or secondary transform and others.

Video encoder 20 and video decoder 30 may be configured to perform various intra mode coding techniques, described in more detail below. As different number of intra modes may be used, to signal a mode, and MPM list size may also vary. In another example, MPM list size may be the same for all number of intra modes. When the smaller set of modes (e.g., 67 or 35) is stored in a LUT, an index of LUT corresponding to a mode may be signaled, instead of the mode value itself. The decoder 30 may decode the actual mode from the decoded index and using LUT.

If a mode is not MPM, the mode may be further classified as being a mode from the selected mode set, or as being a mode not from the selected mode set, for example, as is currently used in JEM. Similarly, the number of the selected modes may vary depending on the number of intra modes. For example, the number of selected modes may be 32 for 131 modes, 16 for 67 modes, 8 for 35 modes. If the mode to be coded is one of the selected modes, an index of the mode in the selected mode set may be signaled rather than the mode value itself.

Similarly, the maximum mode number for non-selected modes may vary depending on the used number of intra modes. For example, the maximum mode number may be 93 modes for 131 modes and MPM list size of 6; 45 for 67 modes and 6 MPM modes, and 21 for 35 modes and 6 MPM modes. In general, the mode value may be calculated as (number of modes)—(MPM modes)—(number of selected modes).

To signal a mode, modes included into the MPM list and the mode to be signaled may be converted from the modes represented by the largest number of intra modes (131) to a mode represented by a desired number of intra modes. In this example, if the mode is not MPM, the intra mode value to be signaled may be adjusted by subtracting the MPM modes as is currently done in HEVC and JEM.

Chroma components may apply intra modes used for luma component (DM modes) to derive chroma intra prediction. In this example, the intra modes used for chroma component may be converted to intra mode corresponding to a number of modes used for chroma. The number of modes used for chroma may be block size or block area dependent. For example, in the DM mode, which is intra mode of a block from the corresponding luma component, is from one intra mode range (for example, 131), but corresponding chroma block may have a mode from another intra mode range (for example, 67), then the luma mode may be converted from a mode of 131 to a mode of 67, as for example described in the above examples, prior to deriving chroma intra prediction. The different luma and chroma block sizes may happen, for example, when luma and chroma components are coded separately, but luma information may be used to code chroma components. In another example, non-converted intra modes may be used, since chroma intra mode signaling may not be dependent on the total number of intra modes, and a flag may be signaled indicating whether luma intra mode may be used.

MPM list size may be increased, such as from 6 modes to 7 modes, for example. To code MPM index, a binarization that is used to represent MPM index may be different, for example, dependent on the MPM index. For example, one binarization method may be used for smaller MPM indices, i.e. smaller than a certain threshold, and another binarization method may be used for other MPM indices, where the other MPM indices may be coded as actual MPM index minus the threshold. In one example, unary or truncated unary codes may be used as a first binarization method and fixed length binary code or truncated binary code may be used as a second binarization method.

In addition to the MPM list described above, video encoder 20 and video decoder 30 may also be configured to build a secondary MPM list. As described above, selected modes may be uniformly selected from the possible range of intra modes. In the present disclosure, selected modes may be derived from the MPM modes, hence creating a secondary MPM list.

When using two MPM lists, video encoder 20 may, for example, generate a first syntax element indicating if an actual intra prediction mode used to code a block of video is included in the first MPM list. If the actual intra prediction mode is included in the first MPM list, then video encoder 20 may generate a syntax element indicating which entry in the first list corresponds to the actual intra prediction mode. If the actual intra prediction mode is not included in the first MPM list, then video encoder 20 may generate a second syntax element indicating if the actual intra prediction mode used to code a block of video is included in the second MPM list. If the actual intra prediction mode is included in the second MPM list, then video encoder 20 may generate a syntax element indicating which entry in the second list corresponds to the actual intra prediction mode. If the actual intra prediction mode is not included in the second MPM list, then video encoder 20 may generate a syntax element indicating which of the remaining modes corresponds to the actual intra prediction mode. By generating the same first and second MPM lists as video encoder 20 and by receiving the various syntax generate by video encoder 20, video decoder 30 can determine the intra prediction mode used to code the block.

The number of modes derived from each MPM mode may depend on the MPM index, or the modes can be derived from all MPM uniformly. For example, for the MPM mode 0, four secondary modes are derived. Video encoder 20 and video decoder 30 may, for example, derive the secondary modes by applying offset −+1, −+2, −+3, to the MPM mode 0 value. In some implementations, video encoder 20 and video decoder 30 may only include unique modes, i.e., modes not yet added to either the MPM list or the secondary MPM list, in the secondary MPM list. This derivation may be repeated for all MPM modes, or only for certain MPM modes. For example, for the MPM mode 1, the process repeats and 3 secondary unique modes, for example, may be derived and added to the secondary MPM list and continue till the last MPM mode. In general, derivation may be described as selecting a subset of modes around the given mode from all possible intra modes.

The number of derived secondary modes may depend on the MPM mode index, and the number of derived modes may be the greatest for the MPM mode 0 or modes having smaller MPM index. For example, the number of derived modes is {4, 3, 3, 2, 2, 2} for 6 MPM modes, where each value is the number of secondary modes derived from each MPM mode, i.e. four modes are derived from the first MPM mode, three modes are derived from the second and third MPM modes, and two modes are derived from the forth and later MPM modes.

In another example, the derivation may be applied only to certain MPM modes. For example, the derivation may be applied only to angular modes (modes which are not DC or Planar). In general, the derivation may be applied to a subset of MPM modes. In the above example, {4, 3, 3, 2, 2, 2} may be only applied to the angular MPM modes (for example, neither Planar nor DC), where each value is the number of secondary modes derived from each angular MPM mode. In another example, not all MPM modes are used to generate secondary modes. In this example, only the MPM modes from neighboring blocks may be involved.

It may be possible that the secondary modes generated based on MPM modes cannot fill up the second MPM list. Therefore, a default secondary MPM list may be used to fill the remaining modes in the list. In one example, this default second MPM list may be derived by sub-sampling angular modes, for example, uniformly with a sub-sample step-size, which may be optionally doubled every time. For example, for 65 angular modes, the default second MPM list may be {2, 18, 34, 50, 66; 10, 26, 42, 58; 6, 14, 22, 30, 38, 46, 54, 62, etc.}, where initial step size may be 16 or 8. As described above, the number of modes in the secondary MPM list may depend on a number of intra modes that can be used for the current block.

In another example, instead of signaling a flag or index to indicate that intra mode is the one of the selected modes, video encoder 20 may generate, and video decoder 30 may receive, a flag indicating that the actual mode belongs to a subset. The number of subsets may be 2 or more, the size of subsets may be different. For example, the modes after diagonal mode (vertical like modes) may be placed into a vertical subset, and other modes may be placed into a horizontal subset. The flag or index (if more than 2 subsets are used) indicates to which subset a mode to be coded belongs. As a second step, all MPM modes belonging to that chosen subsets may be removed from the subset, since the mode to be coded is not an MPM mode, hence reducing the subset size. After that, the mode value or mode index in the subset may be signaled using a truncated binarization, for example, where the max value may be the subset size. The flag or index may be context coded, and the context may depend on the subset type or subset index, on the modes in the MPM list, or may depend on the number of Intra modes included in an intra mode subset.

To signal intra prediction modes, video encoder 20 and video decoder 30 may also be configured to perform swapping of MPMs and context modeling. Video encoder 20 and video decoder 30 may be configured to swap modes based on block shape. In JEM, rectangular blocks may be used for intra coding: horizontal (height of the block is smaller than the width of the block) and vertical (height of the block is larger than the width of the block).

Neighbor intra modes (e.g., intra modes used for neighboring blocks) may be more frequently chosen depending on the neighbor block position and the shape of the current block. Similarly, some intra mode directions may be more preferable depending on the current block shape. For example, an intra mode from the left neighbor block or vertical angular modes (e.g. modes with index larger than diagonal mode 34 as shown on FIG. 4 for 67 intra mode case) may be more preferable for vertical shape blocks; similarly intra mode for the top neighbor or horizontal intra modes (e.g. angular modes with index less than diagonal mode 34 as shown on FIG. 4 for 67 intra mode case) may be more preferable for horizontal shape blocks.

Therefore, video encoder 20 and video decoder 30 may consider block shape during intra mode coding. For example, the modes included into the MPM list or assigned MPM index may depend on the current block shape and/or how far the MPM mode is from the preferred intra modes, the preferred modes (for example, such as horizontal or vertical mode) may depend on the current block shape as mentioned above. For example, for the vertical shape block, if first two MPMs are both angular, the one closer to a preferred mode, for example vertical mode, may be set as the first MPM and the other one may be set as the second MPM. Similarly, when signaling other intra modes not included in the first or secondary MPM list, the intra modes may be assigned codewords based on the mode's distance from the preferred modes, such as the modes for the vertical and horizontal directions. As an example, for the vertical blocks, the intra mode closer to the vertical direction may have a shorter codeword assigned than the mode which is further from the vertical direction.

In one example, the preferred modes corresponding to one block shape may be mapped to the preferred modes corresponding to another block shape before signaling. Those preferred modes may have a smaller mode index or may assign a shorter codeword. In this way, the preferred modes of different block shapes may be coded together and optionally share the same context modelling, which may potentially result in more efficient coding. For example, vertical intra mode directions (e.g. the modes with larger mode index) may be mapped to the horizontal intra mode directions (e.g. the modes with shorter mode index) before intra mode signaling. In one example, it may be accomplished by index remapping, where, for example, for a mode with ModeIndex the remapping to a NewModeIndex may be done as NewModeIndex=MaxModeIndex−ModeIndex, where MaxModeIndex is the largest intra mode index.

Video decoder 30 may perform inverse mapping, e.g. for certain block shapes, to map back horizontal directions to the vertical directions. In one example, the described mapping may be applied only for selected block shapes or block sizes, such as for the blocks having a height greater than or equal to the width.

For square blocks, MPMs from neighboring blocks, when available and unique, can be also rearranged by favoring modes belonging to a chosen subset of modes. For example, if MPM1 belongs to a first set {Planar, DC, 2, horizontal, vertical, diagonal1, diagonal2} and MPM0 does not belong to that set, MPM0 and MPM1 are swapped. In this example, modes diagonal1 and diagonal2 may correspond to diagonal intra modes, such as, in one example, intra modes 2 and 66 in FIG. 4, respectively.

Video encoder 20 and video decoder 30 may be configured to perform context grouping. In the current JEM, the contexts for MPM index coding are separated into 3 groups, i.e. Planar and DC (non-angular set), a horizontal set (modes from the bottom-left-to-above-right diagonal direction to the diagonal mode inclusive), and a vertical set (from the diagonal mode to above-right-to-bottom-left diagonal direction).

The context set may be refined based on the intra MPM mode direction and/or the current block shape, and/or number of MPM modes in the MPM list.

For example, when the total number of intra mode is 67 (FIG. 4), a context for MPM index may be grouped in a way that the context model depends on the distance to the preferred intra modes, for example vertical or horizontal directions, as shown in the following table.

| Intra mode | 0, 1 | 2 to 5 | 6 to 12 | 13 to 21 | 22 to 28 | 29 to 34 |
|---|---|---|---|---|---|---|
| Context model index | 0 | 1 | 2 | 3 | 2 | 1 |
| Intra mode | | 35 to 38 | 39 to 45 | 46 to 54 | 55 to 61 | 62 to 67 |
| Context model index | | 1 | 2 | 3 | 2 | 1 |

In one example, in a more general approach, a context used to code MPM index is assigned according to the distance of the particular MPM mode (the mode with particular MPM index) from the default or preselected intra modes; in other words, according to how far the current MPM mode is from the default modes. Those default modes may be, for example, horizontal, vertical, diagonal or any other direction.

Figure 6:
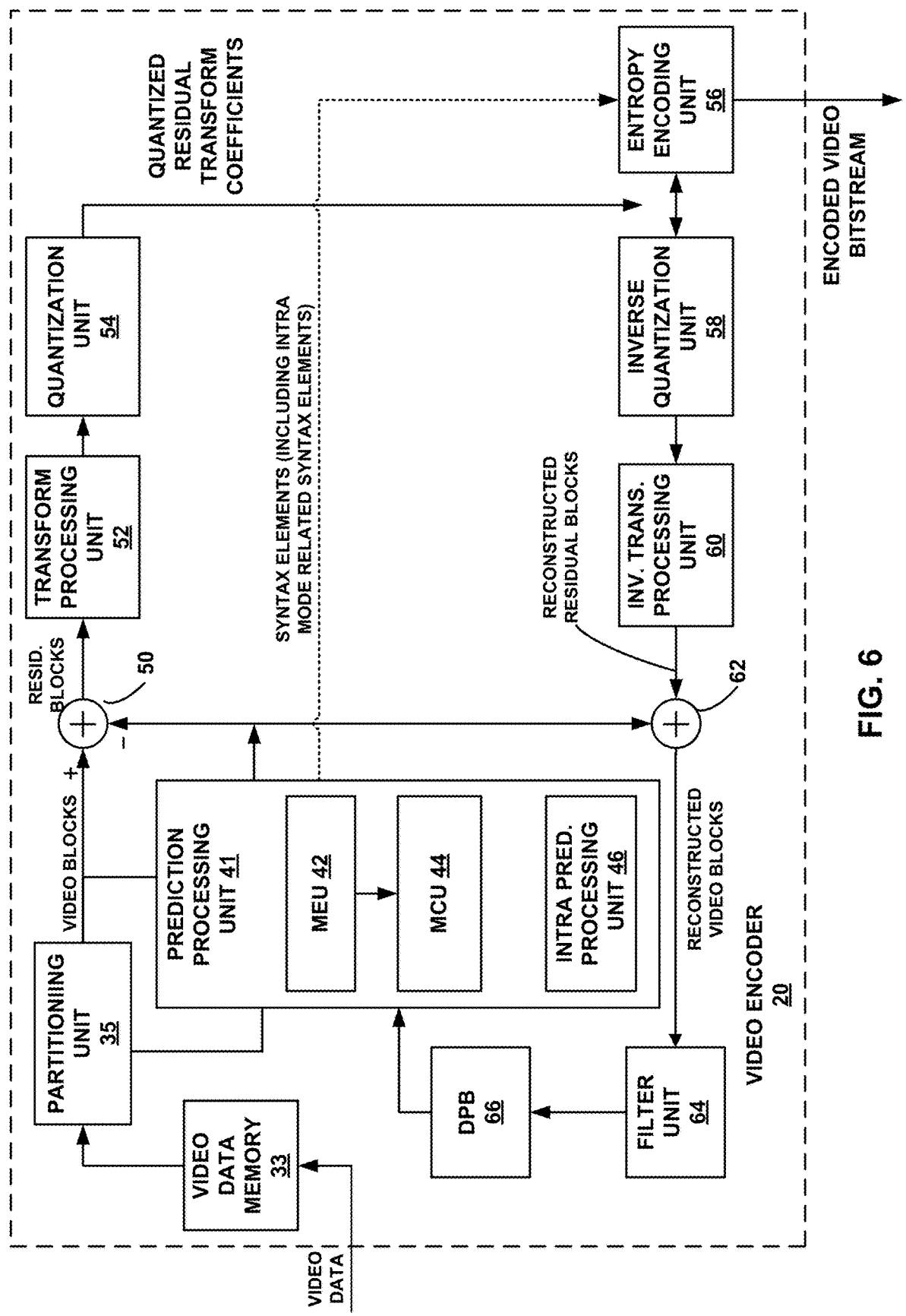
FIG. 6 is a block diagram illustrating an example video encoder that may implement the techniques described in this disclosure.

FIG. 6 is a block diagram illustrating an example video encoder 20 that may implement the techniques described in this disclosure. Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based compression modes. Inter-modes, such as uni-directional prediction (P mode) or bi-prediction (B mode), may refer to any of several temporal-based compression modes.

In the example of FIG. 6, video encoder 20 includes a video data memory 33, partitioning unit 35, prediction processing unit 41, summer 50, transform processing unit 52, quantization unit 54, entropy encoding unit 56. Prediction processing unit 41 includes motion estimation unit (MEU) 42, motion compensation unit (MCU) 44, and intra prediction unit 46. For video block reconstruction, video encoder 20 also includes inverse quantization unit 58, inverse transform processing unit 60, summer 62, filter unit 64, and decoded picture buffer (DPB) 66.

As shown in FIG. 6, video encoder 20 receives video data and stores the received video data in video data memory 33. Video data memory 33 may store video data to be encoded by the components of video encoder 20. The video data stored in video data memory 33 may be obtained, for example, from video source 18. DPB 66 may be a reference picture memory that stores reference video data for use in encoding video data by video encoder 20, e.g., in intra- or inter-coding modes. Video data memory 33 and DPB 66 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 33 and DPB 66 may be provided by the same memory device or separate memory devices. In various examples, video data memory 33 may be on-chip with other components of video encoder 20, or off-chip relative to those components.

Partitioning unit 35 retrieves the video data from video data memory 33 and partitions the video data into video blocks. This partitioning may also include partitioning into slices, tiles, or other larger units, as wells as video block partitioning, e.g., according to a quadtree structure of LCUs and CUs. Video encoder 20 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra coding modes or one of a plurality of inter coding modes, for the current video block based on error results (e.g., coding rate and the level of distortion). Prediction processing unit 41 may provide the resulting intra- or inter-coded block to summer 50 to generate residual block data and to summer 62 to reconstruct the encoded block for use as a reference picture.

Intra prediction unit 46 within prediction processing unit 41 may perform intra-predictive coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices or B slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, video encoder 20 may calculate values for sub-integer pixel positions of reference pictures stored in DPB 66. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in DPB 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in one of the reference picture lists. Video encoder 20 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by video decoder 30 in decoding the video blocks of the video slice.

After prediction processing unit 41 generates the predictive block for the current video block, either via intra prediction or inter prediction, video encoder 20 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. In another example, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. Following the entropy encoding by entropy encoding unit 56, the encoded bitstream may be transmitted to video decoder 30, or archived for later transmission or retrieval by video decoder 30. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within one of the reference picture lists. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed block.

Filter unit 64 filters the reconstructed block (e.g. the output of summer 62) and stores the filtered reconstructed block in DPB 66 for uses as a reference block. The reference block may be used by motion estimation unit 42 and motion compensation unit 44 as a reference block to inter-predict a block in a subsequent video frame or picture. Filter unit 64 may perform any type of filtering such as deblock filtering, SAO filtering, and/or ALF, and/or other types of loop filters. A deblock filter may, for example, apply deblocking filtering to filter block boundaries to remove blockiness artifacts from reconstructed video.

Figure 7:
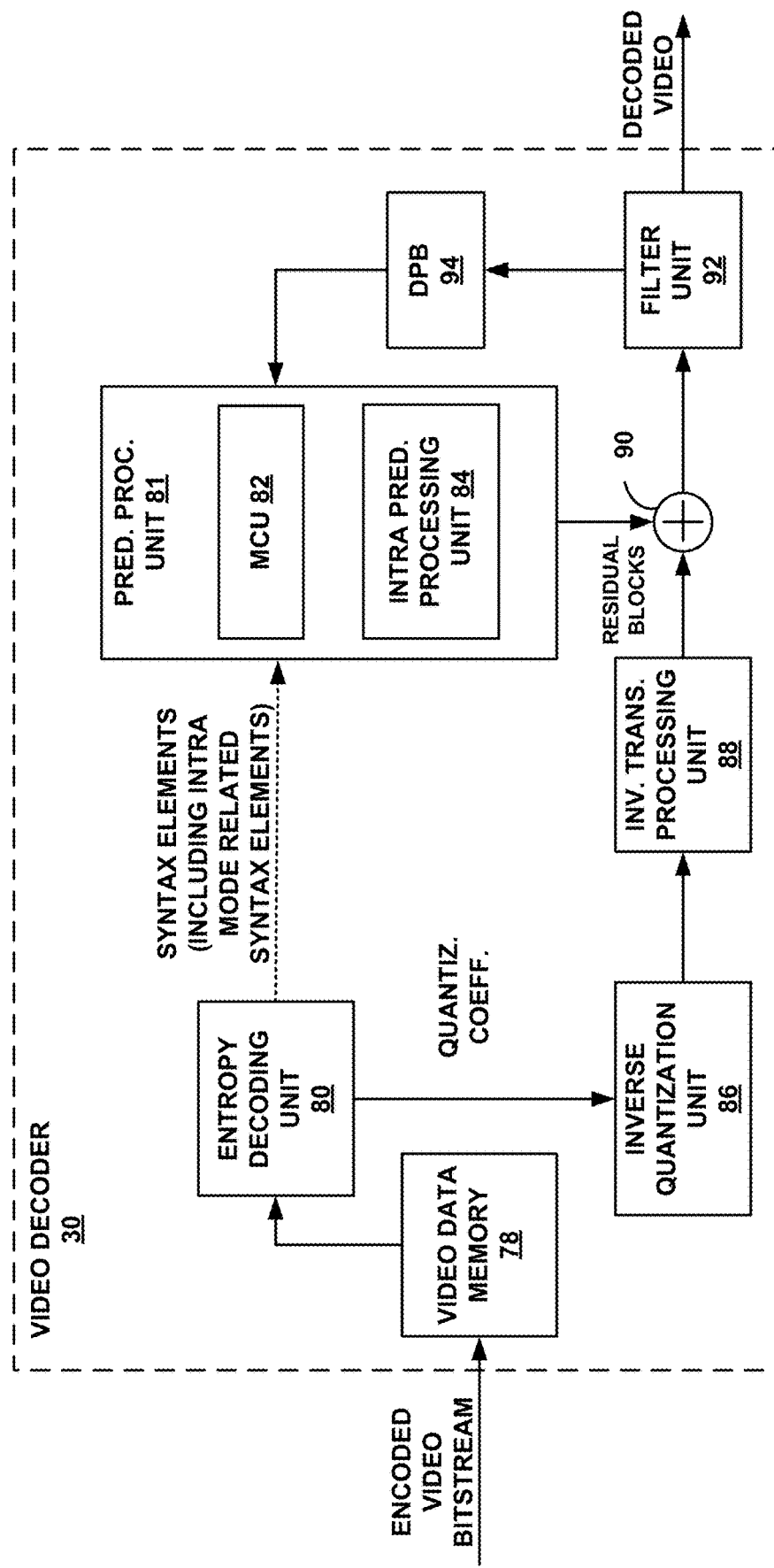
FIG. 7 is a block diagram illustrating an example video decoder that may implement the techniques described in this disclosure.

FIG. 7 is a block diagram illustrating an example video decoder 30 that may implement the techniques described in this disclosure. Video decoder 30 of FIG. 7 may, for example, be configured to receive the signaling described above with respect to video encoder 20 of FIG. 6. In the example of FIG. 7, video decoder 30 includes video data memory 78, entropy decoding unit 80, prediction processing unit 81, inverse quantization unit 86, inverse transform processing unit 88, summer 90, and DPB 94. Prediction processing unit 81 includes motion compensation unit 82 and intra prediction unit 84. Video decoder 30 may, in some examples, perform a decoding pass generally reciprocal to the encoding pass described with respect to video encoder 20 from FIG. 6.

During the decoding process, video decoder 30 receives an encoded video bitstream that represents video blocks of an encoded video slice and associated syntax elements from video encoder 20. Video decoder 30 stores the received encoded video bitstream in video data memory 78. Video data memory 78 may store video data, such as an encoded video bitstream, to be decoded by the components of video decoder 30. The video data stored in video data memory 78 may be obtained, for example, via link 16, from storage device 26, or from a local video source, such as a camera, or by accessing physical data storage media. Video data memory 78 may form a coded picture buffer (CPB) that stores encoded video data from an encoded video bitstream. DPB 94 may be a reference picture memory that stores reference video data for use in decoding video data by video decoder 30, e.g., in intra- or inter-coding modes. Video data memory 78 and DPB 94 may be formed by any of a variety of memory devices, such as DRAM, SDRAM, MRAM, RRAM, or other types of memory devices. Video data memory 78 and DPB 94 may be provided by the same memory device or separate memory devices. In various examples, video data memory 78 may be on-chip with other components of video decoder 30, or off-chip relative to those components.

Entropy decoding unit 80 of video decoder 30 entropy decodes the video data stored in video data memory 78 to generate quantized coefficients, motion vectors, and other syntax elements. Entropy decoding unit 80 forwards the motion vectors and other syntax elements to prediction processing unit 81. Video decoder 30 may receive the syntax elements at the video slice level and/or the video block level.

When the video slice is coded as an intra-coded (I) slice, intra prediction unit 84 of prediction processing unit 81 may generate prediction data for a video block of the current video slice based on a signaled intra prediction mode and data from previously decoded blocks of the current frame or picture. When the video frame is coded as an inter-coded slice (e.g., B slice or P slice), motion compensation unit 82 of prediction processing unit 81 produces predictive blocks for a video block of the current video slice based on the motion vectors and other syntax elements received from entropy decoding unit 80. The predictive blocks may be produced from one of the reference pictures within one of the reference picture lists. Video decoder 30 may construct the reference frame lists, List 0 and List 1, using default construction techniques based on reference pictures stored in DPB 94.

Motion compensation unit 82 determines prediction information for a video block of the current video slice by parsing the motion vectors and other syntax elements, and uses the prediction information to produce the predictive blocks for the current video block being decoded. For example, motion compensation unit 82 uses some of the received syntax elements to determine a prediction mode (e.g., intra- or inter-prediction) used to code the video blocks of the video slice, an inter-prediction slice type (e.g., B slice or P slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by video encoder 20 during encoding of the video blocks to calculate interpolated values for sub-integer pixels of reference blocks. In this case, motion compensation unit 82 may determine the interpolation filters used by video encoder 20 from the received syntax elements and use the interpolation filters to produce predictive blocks.

Inverse quantization unit 86 inverse quantizes, i.e., dequantizes, the quantized transform coefficients provided in the bitstream and decoded by entropy decoding unit 80. The inverse quantization process may include use of a quantization parameter calculated by video encoder 20 for each video block in the video slice to determine a degree of quantization and, likewise, a degree of inverse quantization that should be applied. Inverse transform processing unit 88 applies an inverse transform, e.g., an inverse DCT, an inverse integer transform, or a conceptually similar inverse transform process, to the transform coefficients in order to produce residual blocks in the pixel domain.

After prediction processing unit generates the predictive block for the current video block using, for example, intra or inter prediction, video decoder 30 forms a reconstructed video block by summing the residual blocks from inverse transform processing unit 88 with the corresponding predictive blocks generated by motion compensation unit 82. Summer 90 represents the component or components that perform this summation operation. Filter unit 92 filters the reconstructed video block using, for example, one or more filter techniques.

Filter unit 92 filters the reconstructed block (e.g. the output of summer 90) and stores the filtered reconstructed block in DPB 94 for uses as a reference block. The reference block may be used by motion compensation unit 82 as a reference block to inter-predict a block in a subsequent video frame or picture. Filter unit 92 may perform any type of filtering such as deblock filtering, SAO filtering, and/or ALF, and/or other types of loop filters. A deblock filter may, for example, apply deblocking filtering to filter block boundaries to remove blockiness artifacts from reconstructed video.

Figure 8:
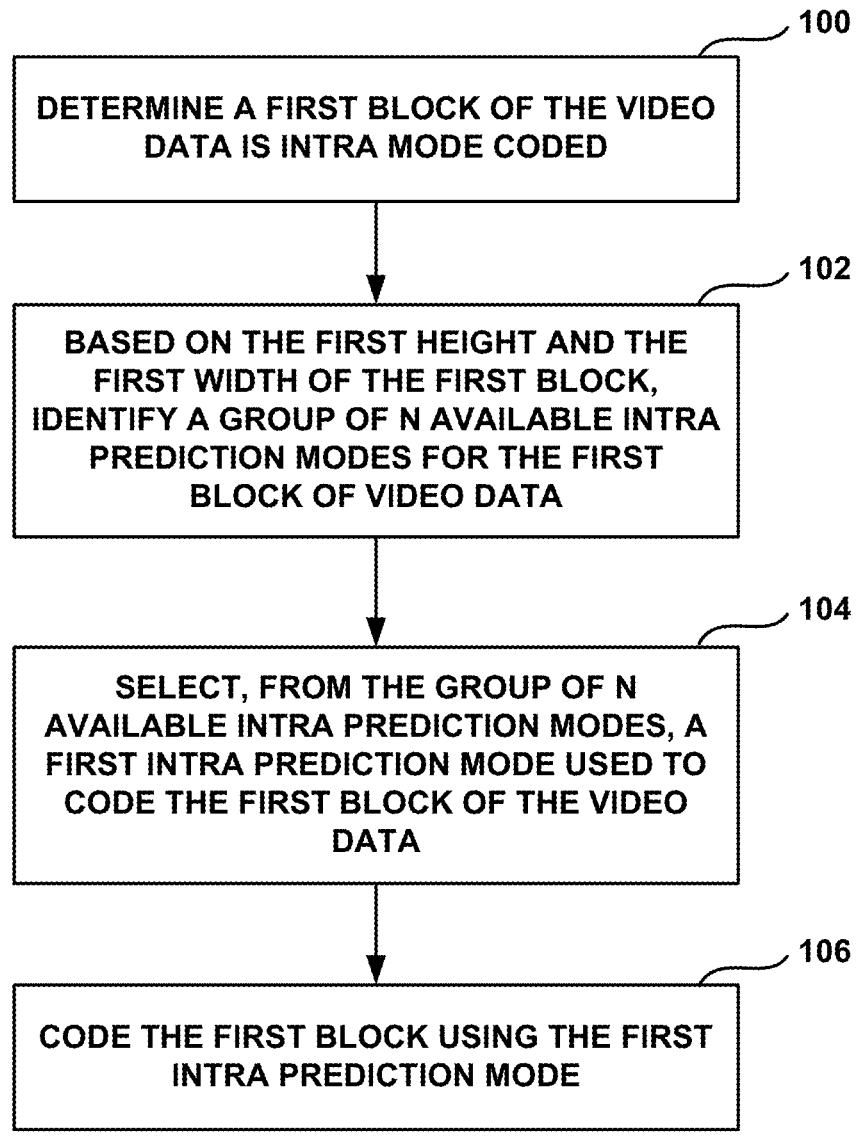
FIG. 8 is a flow diagram illustrating an example video coding process in accordance with the techniques of this disclosure.

FIG. 8 is a flow diagram illustrating an example video coding technique described in this disclosure. The techniques of FIG. 8 will be described with reference to a generic video coder, which may, for example, correspond to a video decoder, such as video decoder 30, or to a video encoder, such as video encoder 20. In the example of FIG. 8, the video coder determines a first block of the video data is intra mode coded (100). Based on the first height and the first width, the video coder identifies a group of N available intra prediction modes for the first block of video data (102). N is an integer value greater than two. The video coder may, for example, determine an area of the first block based on the first height and the first width and based on the area, determine a value for N. In another example, the video coder may determine a shape of the first block based on the first height and the first width and based on the shape, determine a value for N. The shape may, for example, correspond to a vertical rectangle or a horizontal rectangle.

The video coder selects, from the group of N available intra prediction modes, a first intra prediction mode used to code the first block of the video data (104). The video coder codes the first block using the first intra prediction mode (106). In examples, where the video coder is a video encoder, the video coder may code the first block using the first intra prediction mode by encoding the first block using the first intra prediction mode. In examples, where the video coder is a video decoder, the video coder may code the first block using the first intra prediction mode by decoding the first block using the first intra prediction mode.

In addition to the steps shown in FIG. 8, the video coder may also determine a second block of the video data is intra mode coded, wherein the second block of the video data has a second height and a second width and, based on the second height and the second width, identify a group of M available intra prediction modes for the second block of video data. M is a different integer value than N and is greater than two. The video coder selects, from the group of M available intra prediction modes, a second intra prediction mode used to code the second block of the video data. The video coder may signal a threshold value in the video data, and in response to the first block having an area greater than the threshold value, determine a value for N. In response to the second block having an area less than the threshold value, the video coder determines a value for M, with M being smaller than N. Each intra prediction mode in the group of N available intra prediction modes may have a unique index ranging from 0 to N−1, and each intra prediction mode in the group of M available intra prediction modes may have a unique index ranging from 0 to M−1.

In one example, the first height may be greater than the first width, and the video coder may determine a second block of the video data is intra mode coded and has a second height and a second width, with the second width being greater than the second height. Based on the second height and the second width, the video coder identifies a group of M available intra prediction modes for the second block of video data, with the group of M available intra prediction modes including at least one intra prediction mode not included in the group of N available intra prediction modes. The video coder selects, from the group of M available intra prediction modes, a second intra prediction mode used to code the second block of the video data.

Figure 9:
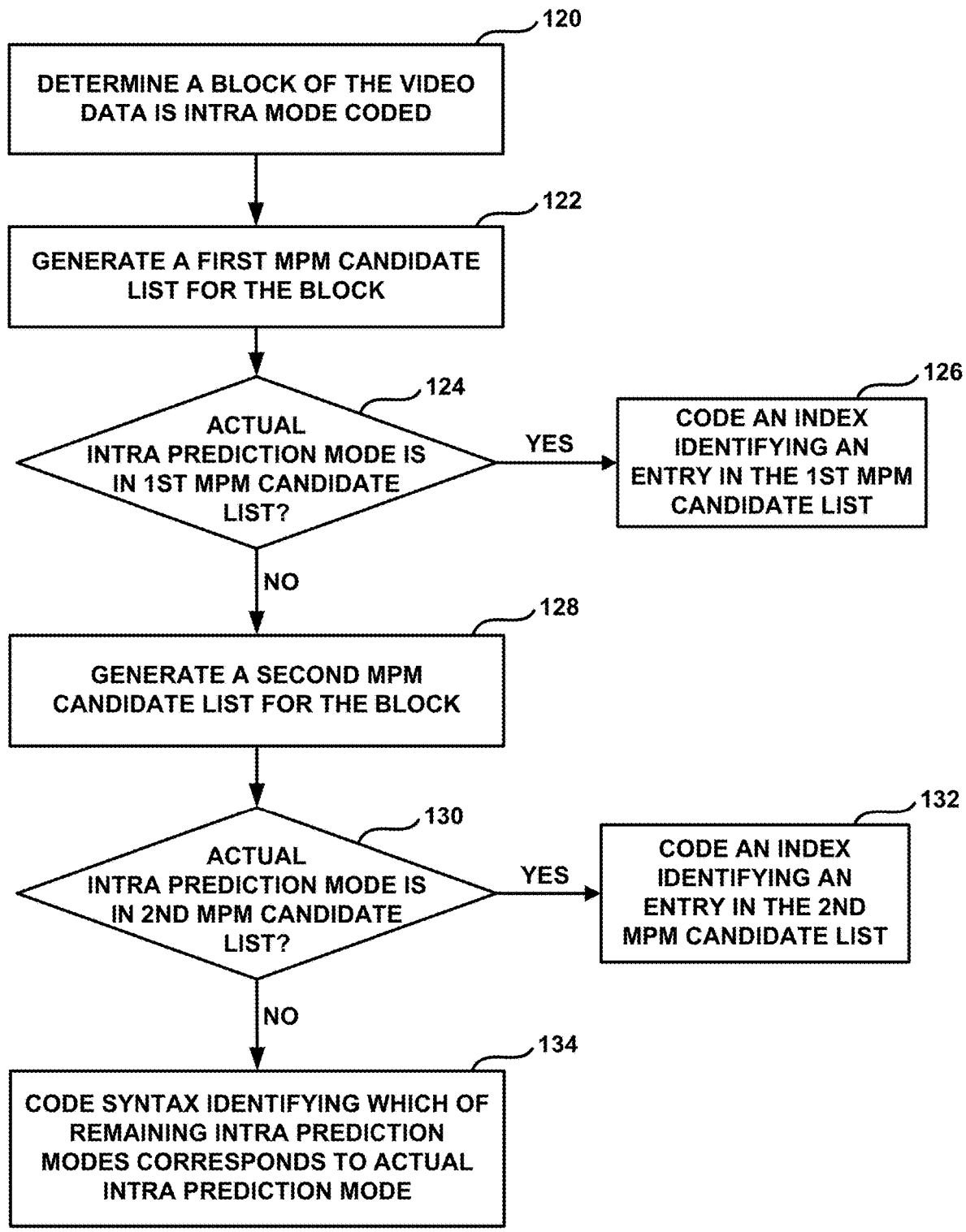
FIG. 9 is a flow diagram illustrating an example video coding process in accordance with the techniques of this disclosure.

FIG. 9 is a flow diagram illustrating an example video coding technique described in this disclosure. The techniques of FIG. 9 will be described with reference to a generic video coder, which may, for example, correspond to a video decoder, such as video decoder 30, or to a video encoder, such as video encoder 20. In the example of FIG. 9, the video coder determines a block of the video data is intra mode coded (120). The video coder generates a first MPM candidate list for the block (122). The video coder then codes a flag indicating if the actual intra prediction mode is included in the first MPM list (124). In the case of a video encoder, the video encoder generates the flag for inclusion in the bitstream of encoded video data. In the case of a video decoder, the video decoder receives the flag in the bitstream and decodes the flag. If the video coder codes a first flag indicating an actual intra prediction mode used to code the block is included in the first MPM candidate list (124, YES), then the video coder codes (e.g., either generates of receives) an index value identifying which entry in the first MPM candidate list corresponds to the actual intra prediction mode used to code the block (126).

If the video coder codes a first flag indicating an actual intra prediction mode used to code the block is not included in the first MPM candidate list (124, NO), then the video coder generates a second MPM candidate list for the block (128). According to the techniques of this disclosure, the video coder may generate the second MPM candidate list by deriving at least one candidate intra prediction mode for inclusion in the second MPM candidate list based on an intra prediction mode in the first MPM candidate list. The intra prediction mode in the first MPM candidate list may, for example, correspond to an intra prediction mode used to code a neighboring block of the block or is derived based on the intra prediction mode used to code the neighboring block. The video coder may derive the at least one candidate intra prediction mode for inclusion in the second MPM candidate list based on the intra prediction mode in the first MPM candidate list by adding an offset to the intra prediction mode in the first MPM candidate list. The video coder may generate the second MPM candidate list such that all modes in the second MPM candidate list are distinct from all modes in the first MPM candidate list. The video coder may generate the second MPM candidate list by adding at least one default candidate to the second MPM candidate list. To derive the at least one candidate mode for inclusion in the second MPM candidate list, the video coder may derive M candidate modes, wherein M is an integer value, by determining the integer value for M based on a mode index of the mode in the first MPM candidate list.

The video coder then codes a second flag indicating if the actual intra prediction mode is included in the second MPM list (130). If the video coder codes a second flag indicating an actual intra prediction mode used to code the block is included in the second MPM candidate list (130, YES), then the video coder codes (e.g., either generates of receives) an index value identifying which entry in the second MPM candidate list corresponds to the actual intra prediction mode used to code the block (132). If the video coder codes a second flag indicating an actual intra prediction mode used to code the block is not included in the first MPM candidate list (130, NO), then the video coder codes syntax identifying which of the remaining intra prediction modes corresponds to the actual intra prediction mode (134).

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for coding video data, the method comprising:
   determining a first block of the video data is intra mode coded, wherein the first block of the video data has a first height and a first width, wherein the first height is different than the first width;
   based on the first height and the first width, generating a candidate list of a group of N available intra prediction modes for the first block of video data, wherein N is an integer value greater than two, wherein generating the candidate list comprises ordering the N available intra prediction modes based on the first height and the first width, wherein ordering the N available intra prediction modes based on the first height and the first width comprises:
      identifying an intra prediction mode used to code an above neighboring block as a first candidate intra prediction mode;
      identifying an intra prediction mode used to code a left neighboring block as a second candidate intra prediction mode;
      adding at least one of the first candidate intra prediction mode and the second candidate intra prediction mode to the candidate list and
      assigning an index to the at least one of the first candidate intra prediction mode and the second candidate intra prediction mode based on the first height and the first width;
   selecting from the group of N available intra prediction modes, a first intra prediction mode used to code the first block of the video data; and
   coding the first block using the first intra prediction mode.

2. The method of claim 1, further comprising:
   determining a second block of the video data is intra mode coded, wherein the second block of the video data has a second height and a second width;
   based on the second height and the second width, identifying a group of M available intra prediction modes for the second block of video data, wherein M is a different integer value than N and is greater than two; and
   selecting from the group of M available intra prediction modes, a second intra prediction mode used to code the second block of the video data.

3. The method of claim 2, further comprising:
   signaling a threshold value in the video data;
   in response to the first block having an area greater than the threshold value, determining a value for N;
   in response to the second block having an area less than the threshold value, determining a value for M, wherein M is smaller than N.

4. The method of claim 2, wherein each intra prediction mode in the group of N available intra prediction modes has a unique index ranging from 0 to N−1, and wherein each intra prediction mode in the group of M available intra prediction modes has a unique index ranging from 0 to M−1.

5. The method of claim 1, wherein the first height is greater than the first width, the method further comprising:
   determining a second block of the video data is intra mode coded, wherein the second block of the video data has a second height and a second width, and wherein the second width is greater than the second height;
   based on the second height and the second width, identifying a group of M available intra prediction modes for the second block of video data, wherein the group of M available intra prediction modes includes at least one intra prediction mode not included in the group of N available intra prediction modes; and
   selecting from the group of M available intra prediction modes, a second intra prediction mode used to code the second block of the video data.

6. The method of claim 1, further comprising:
   determining an area of the first block based on the first height and the first width; and
   based on the area, determining a value for N.

7. The method of claim 1, wherein coding the first block using the first intra prediction mode comprises one of:
   encoding the first block using the first intra prediction mode; or
   decoding the first block using the first intra prediction mode.

8. A device for coding video data, the device comprising:
   a memory configured to store the video data; and
   one or more processors configured to:
      determine a first block of the video data is intra mode coded, wherein the first block of the video data has a first height and a first width, wherein the first height is different than the first width;
      based on the first height and the first width, generate a candidate list of a group of N available intra prediction modes for the first block of video data, wherein N is an integer value greater than two, wherein to generate the candidate list, the one or more processors are configured to order the N available intra prediction modes based on the first height and the first width, wherein to order the N available intra prediction modes based on the first height and the first width, the one or more processors are further configured to:
         identify an intra prediction mode used to code an above neighboring block as a first candidate intra prediction mode;
         identify an intra prediction mode used to code a left neighboring block as a second candidate intra prediction mode;
         add at least one of the first candidate intra prediction mode and the second candidate intra prediction mode to the candidate list and assign an index to the at least one of the first candidate intra prediction mode and the second candidate intra prediction mode based on the first height and the first width;
      select from the group of N available intra prediction modes, a first intra prediction mode used to code the first block of the video data; and
      code the first block using the first intra prediction mode.

9. The device of claim 8, wherein the one or more processors are further configured to:
   determine a second block of the video data is intra mode coded, wherein the second block of the video data has a second height and a second width;
   based on the second height and the second width, identify a group of M available intra prediction modes for the second block of the video data, wherein M is a different integer value than N and is greater than two; and select from the group of M available intra prediction modes, a second intra prediction mode used to code the second block of the video data.

10. The device of claim 9, wherein the one or more processors are further configured to:
signal a threshold value in the video data;
in response to the first block having an area greater than the threshold value, determine a value for N;
in response to the second block having an area less than the threshold value, determine a value for M, wherein M is smaller than N.

11. The device of claim 9, wherein each intra prediction mode in the group of N available intra prediction modes has a unique index ranging from 0 to N−1, and wherein each intra prediction mode in the group of M available intra prediction modes has a unique index ranging from 0 to M−1.

12. The device of claim 8, wherein the first height is greater than the first width, wherein the one or more processors are further configured to:
determine a second block of the video data is intra mode coded, wherein the second block of the video data has a second height and a second width, and wherein the second width is greater than the second height;
based on the second height and the second width, identify a group of M available intra prediction modes for the second block of the video data, wherein the group of M available intra prediction modes includes at least one intra prediction mode not included in the group of N available intra prediction modes; and
select from the group of M available intra prediction modes, a second intra prediction mode used to code the second block of the video data.

13. The device of claim 8, wherein the one or more processors are further configured to:
determine an area of the first block based on the first height and the first width; and
based on the area, determine a value for N.

14. The device of claim 8, wherein to code the first block using the first intra prediction mode, the one or more processors are further configured to at least one of:
encode the first block using the first intra prediction mode; or
decode the first block using the first intra prediction mode.

15. The device of claim 8, wherein the device comprises a wireless communication device, further comprising a receiver configured to receive encoded video data.

16. The device of claim 15, wherein the wireless communication device comprises a telephone handset and wherein the receiver is configured to demodulate, according to a wireless communication standard, a signal comprising the encoded video data.

17. The method of claim 1, wherein ordering the N available intra prediction modes based on the first height and the first width further comprises:
in response to the first height being greater than the first width and both the first candidate intra prediction mode and the second candidate intra prediction modes being angular modes, determining which of the first candidate intra prediction mode and the second candidate intra prediction mode more closely corresponds to a vertical prediction direction; and
adding the one of the first candidate intra prediction mode and the second candidate intra prediction mode that more closely corresponds to the vertical prediction direction to the candidate list.

18. The method of claim 1, wherein ordering the N available intra prediction modes based on the first height and the first width further comprises:
in response to the first width being greater than the first height and both the first candidate intra prediction mode and the second candidate intra prediction modes being angular modes, determining which of the first candidate intra prediction mode and the second candidate intra prediction mode more closely corresponds to a horizontal prediction direction; and
adding the one of the first candidate intra prediction mode and the second candidate intra prediction mode that more closely corresponds to the horizontal prediction direction to the candidate list.

19. The method of claim 1, wherein ordering the N available intra prediction modes based on the first height and the first width further comprises:
in response to the first height being greater than the first width and both the first candidate intra prediction mode and the second candidate intra prediction modes being angular modes, determining which of the first candidate intra prediction mode and the second candidate intra prediction mode more closely corresponds to a vertical prediction direction; and
assigning the one of the first candidate intra prediction mode and the second candidate intra prediction mode that more closely corresponds to the vertical prediction direction to a lower index in the candidate list than the other of the first candidate intra prediction mode and the second candidate intra prediction mode.

20. The method of claim 1, wherein ordering the N available intra prediction modes based on the first height and the first width further comprises:
in response to the first width being greater than the first height and both the first candidate intra prediction mode and the second candidate intra prediction modes being angular modes, determining which of the first candidate intra prediction mode and the second candidate intra prediction mode more closely corresponds to a horizontal prediction direction; and
assigning the one of the first candidate intra prediction mode and the second candidate intra prediction mode that more closely corresponds to the horizontal prediction direction to a lower index in the candidate list than the other of the first candidate intra prediction mode and the second candidate intra prediction mode.

21. The device of claim 8, wherein to order the N available intra prediction modes based on the first height and the first width, the one or more processors are further configured to:
in response to the first height being greater than the first width and both the first candidate intra prediction mode and the second candidate intra prediction modes being angular modes, determine which of the first candidate intra prediction mode and the second candidate intra prediction mode more closely corresponds to a vertical prediction direction; and
add the one of the first candidate intra prediction mode and the second candidate intra prediction mode that more closely corresponds to the vertical prediction direction to the candidate list.

22. The device of claim 8, wherein to order the N available intra prediction modes based on the first height and the first width, the one or more processors are further configured to:
in response to the first width being greater than the first height and both the first candidate intra prediction mode and the second candidate intra prediction modes being angular modes, determine which of the first candidate intra prediction mode and the second candidate intra prediction mode more closely corresponds to a horizontal prediction direction; and add the one of the first candidate intra prediction mode and the second candidate intra prediction mode that more closely corresponds to the horizontal prediction direction to the candidate list.

23. The device of claim 8, wherein to order the N available intra prediction modes based on the first height and the first width, the one or more processors are further configured to:

in response to the first height being greater than the first width and both the first candidate intra prediction mode and the second candidate intra prediction modes being angular modes, determine which of the first candidate intra prediction mode and the second candidate intra prediction mode more closely corresponds to a vertical prediction direction; and assign the one of the first candidate intra prediction mode and the second candidate intra prediction mode that more closely corresponds to the vertical prediction direction to a lower index in the candidate list than the other of the first candidate intra prediction mode and the second candidate intra prediction mode.

24. The device of claim 8, wherein to order the N available intra prediction modes based on the first height and the first width, the one or more processors are further configured to:

in response to the first width being greater than the first height and both the first candidate intra prediction mode and the second candidate intra prediction modes being angular modes, determine which of the first candidate intra prediction mode and the second candidate intra prediction mode more closely corresponds to a horizontal prediction direction; and assign the one of the first candidate intra prediction mode and the second candidate intra prediction mode that more closely corresponds to the horizontal prediction direction to a lower index in the candidate list than the other of the first candidate intra prediction mode and the second candidate intra prediction mode.

\* \* \* \* \*